US011792056B2

(12) United States Patent
Lee et al.

(10) Patent No.: US 11,792,056 B2
(45) Date of Patent: Oct. 17, 2023

(54) METHOD OF PERFORMING SYNCHRONIZATION AND FREQUENCY OFFSET ESTIMATION BASED ON SIMULTANEOUS PHASE COMPENSATION OF SINGLE TRAINING SEQUENCE AND RECEIVER PERFORMING THE SAME

(71) Applicant: SAMSUNG ELECTRONICS CO., LTD., Suwon-si (KR)

(72) Inventors: Jinyong Lee, Seoul (KR); Hyeonjun Kim, Suwon-si (KR); Hyunbae Jeon, Suwon-si (KR); Sungsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 17/453,917

(22) Filed: Nov. 8, 2021

(65) Prior Publication Data

US 2022/0200828 A1 Jun. 23, 2022

(30) Foreign Application Priority Data

Dec. 18, 2020 (KR) ........................ 10-2020-0178354
Feb. 15, 2021 (KR) ........................ 10-2021-0019656

(51) Int. Cl.
*H04L 27/00* (2006.01)
*H04L 27/26* (2006.01)

(52) U.S. Cl.
CPC ........ *H04L 27/0014* (2013.01); *H04L 27/266* (2013.01); *H04L 27/2675* (2013.01); *H04L 2027/0042* (2013.01)

(58) Field of Classification Search
CPC ............... H04L 27/0014; H04L 27/266; H04L 27/2675; H04L 2027/0042
USPC .......................................................... 375/262
See application file for complete search history.

(56) References Cited

U.S. PATENT DOCUMENTS

| | | | |
|---|---|---|---|
| 6,754,473 | B1 | 6/2004 | Choi et al. |
| 7,027,429 | B2 | 4/2006 | Laroia et al. |
| 7,149,239 | B2 | 12/2006 | Hudson |
| 8,107,561 | B2 | 1/2012 | Huang et al. |
| 8,218,605 | B2 | 7/2012 | Wang et al. |
| 8,446,894 | B2 | 5/2013 | Li |
| 9,391,690 | B2 | 7/2016 | Jong et al. |
| 9,432,235 | B2 | 8/2016 | Asjadi |
| 10,637,708 | B2 | 4/2020 | Asjadi |

(Continued)

*Primary Examiner* — Kevin M Burd
(74) *Attorney, Agent, or Firm* — F. CHAU & ASSOCIATES, LLC

(57) ABSTRACT

The present disclosure includes a method of performing synchronization and frequency offset estimation The method includes an input signal corresponding to a single received training sequence. Phase information and a phase index are generated by performing an auto-correlation function (ACF) on the input signal. A templet signal associated with a sample index of the input signal is generated based on at least one pre-stored look-up table (LUT), the phase index, a frequency bandwidth of the input signal, and the sample index. Power associated with the sample index is calculated by performing a matched filtering on the input signal based on the templet signal. A synchronization timing and a frequency offset for the input signal are simultaneously determined based on a result of the matched filtering.

20 Claims, 25 Drawing Sheets

START
RECEIVE INPUT SIGNAL CORRESPONDING TO SINGLE TRAINING SEQUENCE — S100
GENERATE PHASE INFORMATION AND PHASE INDEX BY PERFORMING ACF ON INPUT SIGNAL — S200
GENERATE TEMPLET SIGNAL ASSOCIATED WITH SAMPLE INDEX BASED ON AT LEAST ONE LOOK-UP TABLE, PHASE INDEX, FREQUENCY BANDWIDTH AND SAMPLE INDEX — S300
CALCULATE POWER ASSOCIATED WITH SAMPLE INDEX BY PERFORMING MATCHED FILTERING ON INPUT SIGNAL BASED ON TEMPLET SIGNAL — S400
SIMULTANEOUSLY DETERMINE SYNCHRONIZATION TIMING AND FREQUENCY OFFSET FOR INPUT SIGNAL BASED ON RESULT OF MATCHED FILTERING — S500
END

(56) References Cited

U.S. PATENT DOCUMENTS

2013/0279492 A1 10/2013 Mehta
2021/0234738 A1 * 7/2021 Ryan .................. H03H 17/0254

* cited by examiner

FIG. 8A

| SIDX | 0 | 1 | ··· | n | ··· | $N_M-1$ |
|---|---|---|---|---|---|---|
| TEM_REF_RE | $T_{RE}(0)$ | $T_{RE}(1)$ | ··· | $T_{RE}(n)$ | ··· | $T_{RE}(N_M-1)$ |
| TEM_REF_IM | $T_{IM}(0)$ | $T_{IM}(1)$ | ··· | $T_{IM}(n)$ | ··· | $T_{IM}(N_M-1)$ |

FIG. 8B

| SIDX | 0 | 1 | … | n | … | $N_M-1$ |
|---|---|---|---|---|---|---|
| P_STEP_RE1 | $S_{RE}(0,0)$ | $S_{RE}(1,0)$ | … | $S_{RE}(n,0)$ | … | $S_{RE}(N_M-1,0)$ |
| P_STEP_RE2 | $S_{RE}(0,1)$ | $S_{RE}(1,1)$ | … | $S_{RE}(n,1)$ | … | $S_{RE}(N_M-1,1)$ |
| P_STEP_IM1 | $S_{IM}(0,0)$ | $S_{IM}(1,0)$ | … | $S_{IM}(n,0)$ | … | $S_{IM}(N_M-1,0)$ |
| P_STEP_IM2 | $S_{IM}(0,1)$ | $S_{IM}(1,1)$ | … | $S_{IM}(n,1)$ | … | $S_{IM}(N_M-1,1)$ |

| $T_{RE}(n)$ | 1 | $T_{IM}(n)$ | -1 |
|---|---|---|---|
| $S_{RE}(n,0)$ | 120 | $S_{IM}(n,0)$ | 70 |
| $S_{RE}(n,1)$ | 180 | $S_{IM}(n,1)$ | 120 |

| $T_{RE}(n)$ | 0 | $T_{IM}(n)$ | 1 |
|---|---|---|---|
| $S_{RE}(n,0)$ | 120 | $S_{IM}(n,0)$ | 70 |
| $S_{RE}(n,1)$ | 180 | $S_{IM}(n,1)$ | 120 |

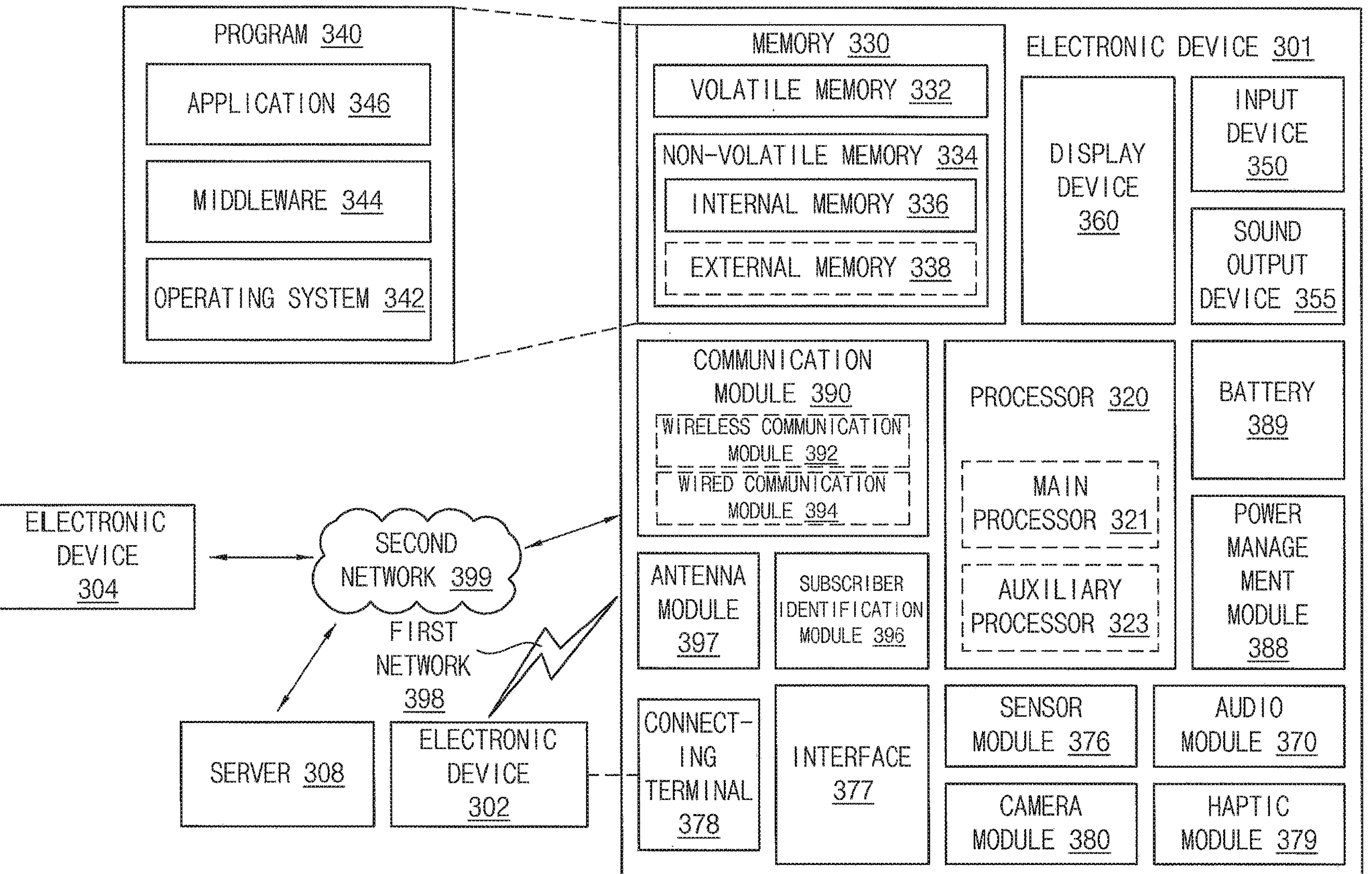
FIG. 23
300
PROGRAM 340
APPLICATION 346
MIDDLEWARE 344
OPERATING SYSTEM 342
MEMORY 330
VOLATILE MEMORY 332
NON-VOLATILE MEMORY 334
INTERNAL MEMORY 336
EXTERNAL MEMORY 338
ELECTRONIC DEVICE 301
DISPLAY DEVICE 360
INPUT DEVICE 350
SOUND OUTPUT DEVICE 355
COMMUNICATION MODULE 390
WIRELESS COMMUNICATION MODULE 392
WIRED COMMUNICATION MODULE 394
PROCESSOR 320
MAIN PROCESSOR 321
AUXILIARY PROCESSOR 323
BATTERY 389
POWER MANAGEMENT MODULE 388
ANTENNA MODULE 397
SUBSCRIBER IDENTIFICATION MODULE 396
ELECTRONIC DEVICE 304
SECOND NETWORK 399
FIRST NETWORK 398
SERVER 308
ELECTRONIC DEVICE 302
CONNECTING TERMINAL 378
INTERFACE 377
SENSOR MODULE 376
AUDIO MODULE 370
CAMERA MODULE 380
HAPTIC MODULE 379

METHOD OF PERFORMING SYNCHRONIZATION AND FREQUENCY OFFSET ESTIMATION BASED ON SIMULTANEOUS PHASE COMPENSATION OF SINGLE TRAINING SEQUENCE AND RECEIVER PERFORMING THE SAME

CROSS-REFERENCE TO RELATED APPLICATION

This application claims priority under 35 USC § 119 to Korean Patent Application No. 10-2020-0178354 filed on Dec. 18, 2020 and to Korean Patent Application No. 10-2021-0019656 filed on Feb. 15, 2021 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of performing synchronization and frequency offset estimation based on simultaneous phase compensation of single training sequence, and receivers performing the methods.

2. Description of the Related Art

A wireless communication system is a system used to communication data or information using light waves between electronic devices. Mobile phones, computers, and navigation systems use wireless communication to send and receive information between devices.

In a wireless communication system, a strong communication signal is important. In particular, the highest possible signal-to-noise ratio (SNR) is desired at a receiving device. Similarly, for a wireless fidelity (WiFi) system, increasing the SNR at the receiving device increases the probability that information is correctly received, and reduces the amount of retransmissions used from a source. Some methods of achieving better SNR at the receiver end is to increase power transmission, decrease the distance between the source and the receiver, or increase antenna gain.

With persistent changes in wireless communication standards, communication in a relatively wide frequency bandwidth is required to maintain an acceptable signal. For example, in a wireless local area network (WLAN) system such as a WiFi system, a standard operating in a bandwidth of about 160 MHz. Methods for synchronization timing and frequency offset detection are based on the band split in a time domain. As a result, performance is affected and more filter coefficients, computational complexity, and delay time are required to reduce the size of transition band. Therefore, there is a need in the art for improved synchronization timing and frequency offset detection.

SUMMARY

At least one example embodiment of the present disclosure provides a method of performing synchronization and frequency offset estimation capable of efficiently detecting synchronization timing and determining frequency offset based on simultaneous phase compensation of single training sequence.

At least one example embodiment of the present disclosure provides a receiver included in a wireless communication system and performs the method described in the present disclosure.

According to example embodiments, in a method of performing synchronization and frequency offset estimation, an input signal corresponding to a single training sequence is received. Phase information and a phase index are generated by performing an auto-correlation function (ACF) on the input signal. A templet signal associated with a sample index of the input signal is generated based on at least one pre-stored look-up table (LUT), the phase index, a frequency bandwidth of the input signal, and the sample index. Power associated with the sample index is calculated by performing a matched filtering on the input signal based on the templet signal. A synchronization timing and a frequency offset for the input signal are simultaneously determined based on a result of the matched filtering.

According to example embodiments, a receiver includes a first calculator, a templet generator and a second calculator. The first calculator receives an input signal corresponding to a single training sequence, and generates phase information and a phase index by performing an auto-correlation function (ACF) on the input signal. The templet generator generates a templet signal associated with a sample index of the input signal based on at least one pre-stored look-up table (LUT), the phase index, a frequency bandwidth of the input signal, and the sample index. The second calculator calculates power associated with the sample index by performing a matched filtering on the input signal based on the templet signal, and simultaneously determines a synchronization timing and a frequency offset for the input signal based on a result of the matched filtering.

According to example embodiments, in a method of performing synchronization and frequency offset estimation, an input signal corresponding to a single training sequence is received. Phase information and a phase index are generated by performing an auto-correlation function (ACF) on the input signal. A templet signal associated with a sample index of the input signal is generated based on at least one pre-stored look-up table (LUT), the phase index, a frequency bandwidth of the input signal, and the sample index. Power associated with the sample index is calculated by performing a matched filtering on the input signal based on the templet signal. A synchronization timing and a frequency offset for the input signal are simultaneously determined based on a result of the matched filtering. When generating the phase information and the phase index, a quantization is performed on the input signal. The auto-correlation function (ACF) is performed on the quantized input signal. An arctangent (ATAN) function is performed on the input signal on which the auto-correlation function (ACF) is performed. The phase information is measured and tracked based on the input signal on which the arctangent (ATAN) function is performed. The phase index is generated based on the phase information. When generating the templet signal associated with the sample index, a reference templet signal is obtained from a first look-up table based on the frequency bandwidth and the sample index. A plurality of reference values are obtained from a second look-up table based on the frequency bandwidth and the sample index. The second look-up table is different from the first look-up table. A first direction decision signal is generated based on the sample index. A second direction decision signal is generated based on the sample index, the phase index, and the plurality of reference values. The templet signal is obtained based on the reference templet signal, the first direction decision signal, and the second direction decision signal. When calculating the power associated with the sample index, first through $N_M$-th powers associated with first through $N_M$-th sample indices that may be included in the input signal are calculated, where $N_M$ is a natural number greater than or equal to two. When simultaneously determining the synchronization timing and the frequency offset for the input signal, one of the first through $N_M$-th sample indices is selected based on the first through $N_M$-th powers, the selected sample index corresponding to a greatest power among the first through $N_M$-th powers. A timing corresponding to the selected sample index is determined as the synchronization timing. An offset corresponding to the selected sample index is determined as the frequency offset.

In the method of performing synchronization and frequency offset estimation and the receiver according to example embodiments, the synchronization timing and the frequency offset may be simultaneously detected using a single training sequence. For example, to reduce the computational complexity, the templet signal (e.g., the phase-reflected templet signal) may be generated using the pre-stored look-up table, and the synchronization timing and the frequency offset may be detected based on a result of performing the matched filtering using the templet signal. Accordingly, the amount of calculation/computation and the time required for calculation/computation may be reduced, the accuracy of detection may be improved or enhanced, and the receiver and the wireless communication system may have improved or enhanced performance.

BRIEF DESCRIPTION OF THE DRAWINGS

Illustrative, non-limiting example embodiments will be more clearly understood from the following detailed description taken in conjunction with the accompanying drawings.

FIGS. 8A and 8B are diagrams illustrating an example of a look-up table used to perform an operation of FIG. 7.

FIG. 23 is a block diagram illustrating an electronic device in a network environment according to example embodiments.

DETAILED DESCRIPTION OF THE EMBODIMENTS

Figure 1:
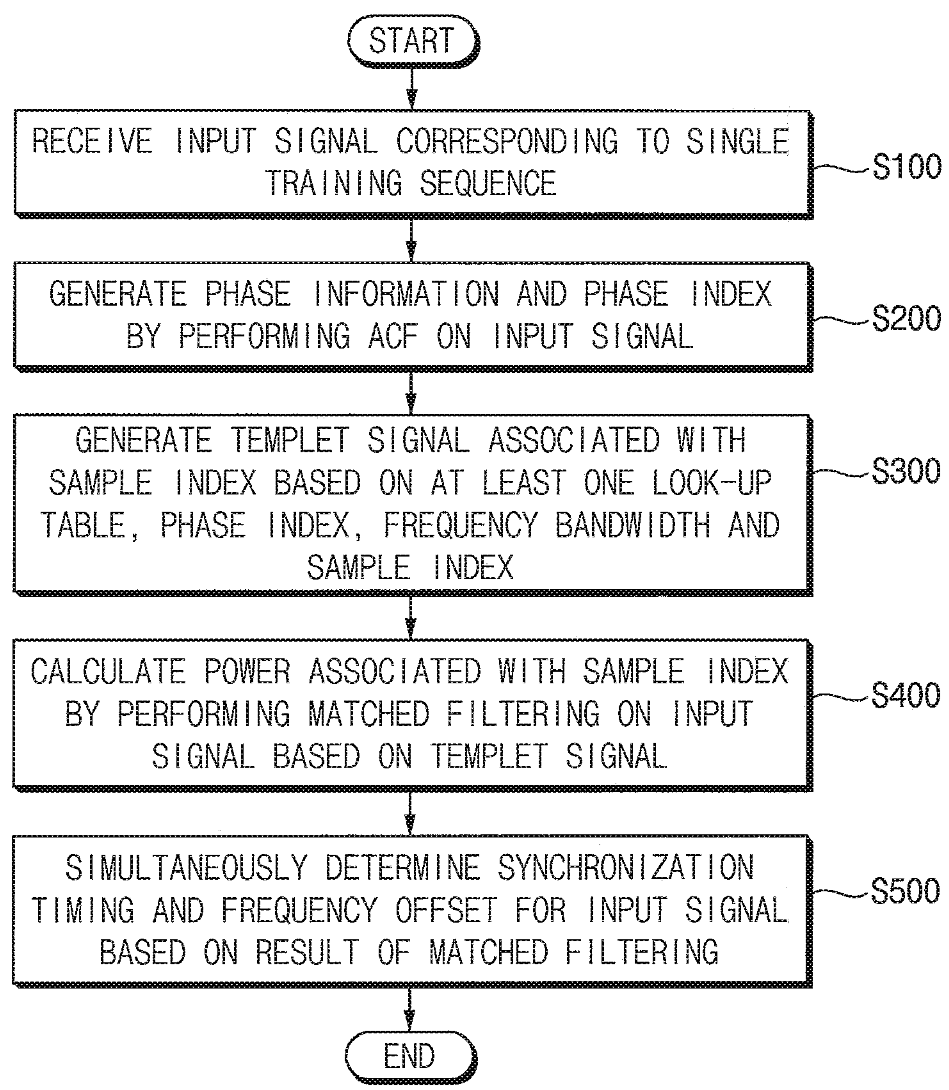
FIG. 1 is a flowchart illustrating a method of performing synchronization and frequency offset estimation according to example embodiments.

The present disclosure relates generally to semiconductor integrated circuits, and more particularly to methods of performing synchronization and frequency offset estimation based on simultaneous phase compensation of single training sequence, and receivers performing the methods.

Development and expansion of wireless communications systems may provide for communication in a relatively wider frequency bandwidth. For communications in such relatively wider frequency bandwidth, some methods for synchronization timing and frequency offset detection (e.g., methods based on the band split in the time domain) may affect performance (e.g., more filter coefficients, computational complexity, and delay time may be required to reduce the size of transition band).

For example, operation delay and frequency response distortion may occur by a filtering process for a band split, or bandwidth split, and the detection performance of frequency offset detection may be affected as communication bandwidth increases. Additionally, training sequence compensation using the coarse frequency offset may affect the synchronization timing detection and fine frequency offset results.

In some embodiments, the present disclosure provides improved synchronization timing and frequency offset detection based on a templet signal, which includes split (or division) band information in a frequency domain. As a result, there is no additional delay and frequency response distortion is reduced. Additionally, accuracy of the synchronization timing and the frequency offset may be improved.

Embodiments of the present disclosure may also be used for various wireless communication standards with more than one training sequence due to using a single training sequence. Further, when embodiments of the present disclosure are applied to a wireless communication standard with two or more training sequences such as the WLAN, accuracy of the synchronization timing may be improved using iterative operation.

A templet signal of the present disclosure, which may include a final templet signal to which the phase information is reflected, may be reconstructed or restored by a simple indexing process from minimum reference signal sets using the first and second look-up tables with a relatively simple structure. Therefore, the computational complexity and the size of the look-up table may be reduced.

The method of performing synchronization and frequency offset estimation includes an input signal corresponding to a single received training sequence. Phase information and a phase index are generated by performing an auto-correlation function (ACF) on the input signal. A templet signal associated with a sample index of the input signal is generated based on at least one pre-stored look-up table (LUT), the phase index, a frequency bandwidth of the input signal, and the sample index. Power associated with the sample index is calculated by performing a matched filtering on the input signal based on the templet signal. A synchronization timing and a frequency offset for the input signal are simultaneously determined based on a result of the matched filtering.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of performing synchronization and frequency offset estimation according to example embodiments.

Referring to FIG. 1, a method of performing synchronization and frequency offset estimation according to example embodiments is performed by a receiver that receives an input signal from a transmitter in a wireless communication system. Detailed configurations of the receiver and a wireless communication system with the receiver will be described with reference to FIG. 2.

In the method of performing synchronization and frequency offset estimation according to example embodiments, an input signal corresponding to a single training sequence is received (step S100). Unlike a conventional method of detecting synchronization timing and frequency offset using two or more different training sequences, synchronization timing and frequency offset may be detected according to example embodiments using a single training sequence.

Phase information and a phase index are generated by performing an auto-correlation function (ACF) on the input signal (step S200). For example, to track and update the frequency offset, the input signal may be delayed, the auto-correlation function may be performed based on the input signal and the delayed input signal. Additionally, or alternatively, the phase information may be obtained by performing the auto-correlation function, and the phase index for representing or indicating the phase information may be calculated. Step S200 will be described with reference to FIGS. 4 and 5.

An ACF refers to a function that provides the correlation of a signal with a delayed copy of itself, as a function of delay. An ACF function can be used to find repeating patterns, such as the presence of a periodic signal obscured by noise, or to identify a fundamental frequency in a signal implied by its harmonic frequencies. An ACF can be used in signal processing for analyzing functions or time series of values.

A templet signal associated with a sample index of the input signal is generated based on at least one pre-defined and pre-stored (or defined and stored in advance) look-up table (LUT), the phase index, a frequency bandwidth of the input signal and the sample index (step S300). The templet signal may be implemented in consideration of the phase index, and may be referred to as a phase index-based templet signal, a phase-reflected templet signal or a phase-applied templet signal. For example, to reduce computational complexity, the templet signal may be generated using the look-up table, and may be simplified and implemented in a ternary structure. Step S300 will be described with reference to FIGS. 6, 7, 8A, 8B, 9, 10, 11A and 11B.

Power associated with the sample index is calculated by performing a matched filtering on the input signal based on the templet signal (step S400). A synchronization timing and a frequency offset for the input signal are simultaneously or concurrently determined based on a result of the matched filtering (step S500). For example, the synchronization timing may be determined by performing a cross-correlation function (CCF) based on the input signal and the templet signal. Steps S400 and S500 will be described with reference to FIGS. 12, 13 and 14.

The communication between the transmitter and the receiver included in the wireless communication system may be performed based on the synchronization timing and the frequency offset determined by step S500.

In the conventional method of detecting the synchronization timing and the frequency offset using training sequences of two different types, coarse synchronization timing and coarse frequency offset are detected first using one training sequence, and then fine synchronization timing and fine frequency offset are detected later using another training sequence. However, there are problems such as a decrease in the accuracy of detection or an increase in the time used for calculation and/or computation.

In the method of performing synchronization and frequency offset estimation according to example embodiments, the synchronization timing and the frequency offset may be simultaneously detected using a single training sequence. For example, to reduce the computational complexity, the templet signal (e.g., the phase-reflected templet signal) may be generated using the pre-stored look-up table, and the synchronization timing and the frequency offset may be detected based on a result of performing the matched filtering using the templet signal. Accordingly, the amount of calculation/computation and the time used for calculation/computation may be reduced, the accuracy of detection may be improved or enhanced, and the receiver and the wireless communication system may have improved or enhanced performance.

Figure 2:
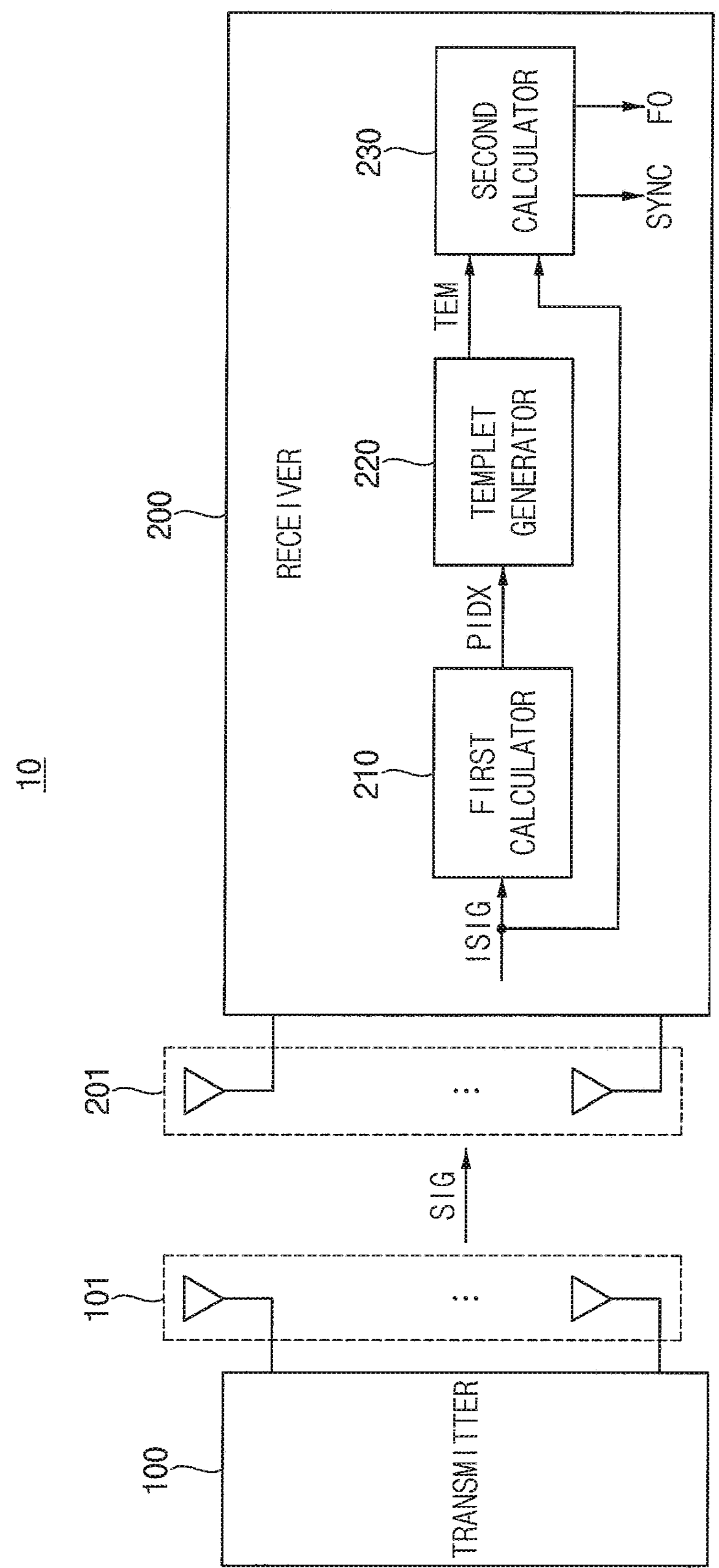
FIG. 2 is a block diagram illustrating a receiver and a wireless communication system with the receiver according to example embodiments.

FIG. 2 is a block diagram illustrating a receiver and a wireless communication system with the receiver according to example embodiments.

Referring to FIG. 2, a wireless communication system 10 includes a transmitter 100 and a receiver 200. The transmitter 100 may be referred to as an access point (AP), and the receiver 200 may be referred to as a station (STA).

In some example embodiments, the wireless communication system 10 may be a wireless communication system that may be implemented or formed based on a wireless local area network (WLAN). For example, the wireless communication system 10 may be a wireless communication system that may be implemented or formed based on a wireless fidelity (WiFi). For example, the WLAN system may be implemented based on the Institute of Electrical and Electronics Engineers (IEEE) 802.11ac standard or the IEEE 802.11ax standard, or may be implemented based on the IEEE 802.11be standard that is a next generation standard.

In the WLAN system, a communication may be performed between the transmitter 100 and the receiver 200 based on an orthogonal frequency division multiplexing (OFDM) scheme. The OFDM scheme is a wideband modulation technology for dividing a frequency bandwidth assigned for a communication session into a plurality of narrowband frequency sub-bands. Each of the narrowband frequency sub-bands may include a radio frequency (RF) sub-carrier. Each sub-carrier may be mathematically orthogonal to the RF sub-carrier included in each of the other sub-channels.

The OFDM scheme is a multi-carrier modulation technology in which data to be transmitted is primarily converted into a complex symbol in the form of M-ary quadrature amplitude modulation (QAM). A complex symbol sequence or a series of complex symbols may be converted into a plurality of parallel complex symbols through a serial-to-parallel conversion. Each of the parallel complex symbols may be rectangular pulse-shaped and sub-carrier modulated. In the multi-carrier modulation technology, the frequency interval between the sub-carriers may be set such that some or all sub-carrier modulated parallel complex symbols are orthogonal. Therefore, in the OFDM scheme, spectrums of the sub-carriers may be overlapped with one another without interruption by other carriers due to the orthogonality of the sub-carriers. Since the frequency bandwidth is divided into a plurality of orthogonal sub-bands, a high data transmission speed and an efficient use of a bandwidth may be possible.

In the WLAN system in which the communication is performed based on the OFDM scheme, the performance of the system may be improved or enhanced when the synchronization timing and the frequency offset for the input signal are accurately and efficiently detected at an initial operation time.

Hereinafter, operations of the wireless communication system 10 and the receiver 200 according to example embodiments will be described with a focus on operation of detecting the synchronization timing and the frequency offset for the input signal at the initial operation time. However, example embodiments are not limited thereto. After detecting the synchronization timing and the frequency offset, the wireless communication system 10 may perform a normal signal (or data) transmission based on the detected synchronization timing and the detected frequency offset.

The transmitter 100 transmits a signal SIG used to detect the synchronization timing and the frequency offset. For example, the signal SIG may be provided in the form of a packet, and may correspond to a single training sequence.

The transmitter 100 may include a plurality of antennas (or transmission antennas) 101. The transmitter 100 may transmit or output the signal SIG using the plurality of antennas 101.

The receiver 200 receives an input signal ISIG corresponding to the signal SIG from the transmitter 100 through a channel, generates phase information and a phase index PIDX by performing an auto-correlation function on the input signal ISIG, generates a templet signal TEM associated with a sample index (e.g., SIDX in FIG. 3) of the input signal ISIG based on at least one pre-stored look-up table, the phase index PIDX, a frequency bandwidth of the input signal ISIG and the sample index SIDX, calculates power associated with the sample index SIDX by performing a matched filtering on the input signal ISIG based on the templet signal TEM, and simultaneously determines a synchronization timing SYNC and a frequency offset FO for the input signal ISIG based on a result of the matched filtering.

The receiver 200 includes a first calculator 210, a templet generator 220 and a second calculator 230. The receiver 200 may further include a plurality of antennas (or reception antennas) 201.

The receiver 200 may receive the input signal ISIG from the transmitter 100 through the channel using the plurality of antennas 201. Although not illustrated in detail, the channel (e.g., a wireless channel) may be formed between the plurality of antennas 101 of the transmitter 100 and the plurality of antennas 201 of the receiver 200.

The first calculator 210 receives the input signal ISIG, and generates the phase information and the phase index PIDX by performing the auto-correlation function on the input signal ISIG. In other words, the first calculator 210 may perform steps S100 and S200 in FIG. 1.

The templet generator 220 generates the templet signal TEM associated with the sample index SIDX based on the look-up table, the phase index PIDX, the frequency bandwidth and the sample index SIDX. In other words, the templet generator 220 may perform step S300 in FIG. 1.

The second calculator 230 calculates the power associated with the sample index SIDX by performing the matched filtering on the input signal ISIG based on the templet signal TEM, and simultaneously determines the synchronization timing SYNC and the frequency offset FO for the input signal ISIG based on the result of the matched filtering. In other words, the second calculator 230 may perform steps S400 and S500 in FIG. 1.

Detailed configurations of the first calculator 210, the templet generator 220 and the second calculator 230 will be described with reference to FIGS. 15, 16 and 17.

In the wireless communication system 10 and the receiver 200 according to example embodiments, the phase information of corresponding sample timing (e.g., the sample index SIDX) may be tracked by calculating and updating the auto-correlation function of the input signal ISIG, the phase index PIDX may be determined based on the phase information corresponding to the sample timing of the input signal ISIG, the templet signal TEM with a ternary structure may be formed or constructed, the synchronization timing SYNC may be detected based on the result of the matched filtering using the templet signal TEM, and the frequency offset FO may be calculated based on the phase information corresponding to the synchronization timing SYNC. Therefore, there is no additional delay and frequency response distortion due to filtering because of using the templet signal TEM with split (or division) band information in a frequency domain, and the accuracy of the synchronization timing SYNC and the frequency offset FO may be improved or enhanced. Additionally, or alternatively, example embodiments may be applied or employed to various standards with more than one training sequence because of using a single training sequence. Further, when example embodiments are applied to a standard with two or more training sequences such as the WLAN, the accuracy may be improved by iterative operation.

Figure 3:
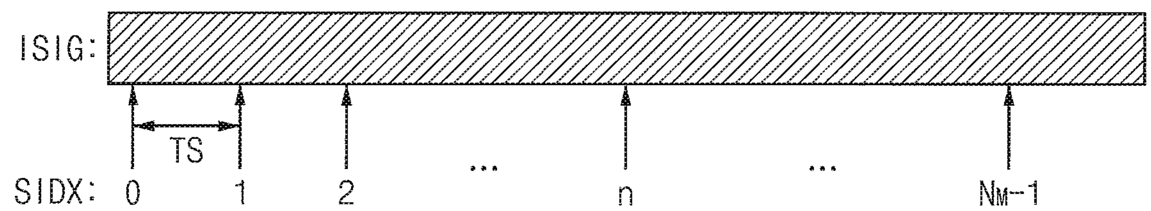
FIG. 3 is a diagram for describing an operation of a receiver and a wireless communication system according to example embodiments.

FIG. 3 is a diagram for describing an operation of a receiver and a wireless communication system according to example embodiments.

Referring to FIG. 3, the sampling, the auto-correlation function, the generation of the templet signal and the cross-correlation function may be performed by periodically setting the sample index SIDX on the input signal ISIG that may be received by the receiver 200 and corresponds to a single training sequence. For example, the input signal ISIG may be an OFDM signal, and the input signal ISIG may include a plurality of OFDM symbols. For example, the sampling may be performed on the input signal ISIG by $N_M$ times, where $N_M$ is a natural number greater than or equal to two.

For example, at a first time point, a first sampling value may be obtained by sampling the input signal ISIG, a first sample index (e.g., "0") for the first sampling value may be obtained, and the auto-correlation function, the generation of the templet signal and the cross-correlation function may be performed based on the first sampling value. Next, at a second time point elapsed by a sampling interval TS from the first time point, a second sampling value may be obtained by sampling the input signal ISIG, a second sample index (e.g., "1") for the second sampling value may be obtained, and the auto-correlation function, the generation of the templet signal and the cross-correlation function may be performed based on the second sampling value. Further, at a third time point elapsed by the sampling interval TS from the second time point, a third sampling value may be obtained by sampling the input signal ISIG, a third sample index (e.g., "2") for the third sampling value may be obtained, and the auto-correlation function, the generation of the templet signal and the cross-correlation function may be performed based on the third sampling value.

Similarly, at an (n+1)-th time point, an (n+1)-th sampling value may be obtained by sampling the input signal ISIG, an (n+1)-th sample index (e.g., "n") for the (n+1)-th sampling value may be obtained, and the auto-correlation function, the generation of the templet signal and the cross-correlation function may be performed based on the (n+1)-th sampling value. At an $N_M$-th time point, an $N_M$-th sampling value may be obtained by sampling the input signal ISIG, an $N_M$-th sample index (e.g., "$N_M-1$") for the $N_M$-th sampling value may be obtained, and the auto-correlation function, the generation of the templet signal and the cross-correlation function may be performed based on the $N_M$-th sampling value.

In some example embodiments, $N_M$ may be determined based on the number of a plurality of sub-carriers included in one OFDM symbol. For example, $N_M$ may be greater than or equal to the number of the plurality of subcarriers.

In some example embodiments, the sampling interval TS may be set to about 4 ms. However, example embodiments are not limited thereto.

In signal modeling, an OFDM signal transmitted in the OFDM scheme may generally use a training sequence in which a specific unit band is repeated in a frequency domain to have pseudo noise (PN) characteristics in a time domain. A(t) may be obtained based on Equation 1, if an arbitrary unit band training sequence of a length Nsub with the PN characteristics in both the time and frequency domains is defined as $X_{Nsub}(k)$ in the frequency domain, which is an ACF value calculated by performing the auto-correlation function on $X_{Nsub}(k)$.

$$A(t) = \frac{1}{Nsub}\sum_{k=0}^{Nsub-1} X_{Nsub}(k)\cdot X^{*}_{Nsub}((k+t)\%Nsub) = \delta(t) \tag{1}$$

If a wideband signal sequence formed by repeating the arbitrary unit band training sequence $X_{Nsub}(k)$ is defined as $x_{sub}(n)$ in the time domain, $x_{sub}(n)$ may be represented by Equation 2, and a(n), which is an ACF value of $x_{sub}(n)$, may be obtained based on Equation 3.

$$x_{sub}(n) = \sum_{k=0}^{Nsub-1} X_{Nsub}(k)\cdot W_{Nsub}^{kn} \tag{2}$$

$$a(n) = \frac{1}{Nsub}\sum_{m=0}^{Nsub-1} x_{sub}(m)\cdot x^{*}_{sub}(m+n) = \delta(n) \tag{3}$$

The auto-correlation (or the auto-correlation function), also known as serial correlation, is the correlation of a signal with a delayed copy of itself as a function of delay. In other words, the auto-correlation is the similarity between observations as a function of the time lag between the observations. The analysis of the auto-correlation is a mathematical tool for finding repeating patterns, such as the presence of a periodic signal obscured by noise, or identifying the missing fundamental frequency in a signal implied by the harmonic frequencies of the signal. The auto-correlation may be used in signal processing for analyzing functions or series of values, such as time-domain signals.

A wideband signal with the arbitrary unit band training sequence $X_{Nsub}(k)$ with a position index "b" is defined based on Equation 4, Equation 5 and Equation 6, and $a_{b_1,b_2}(n)$, which is calculated by performing the cross-correlation function on the wideband signal, may be represented by Equation 7.

$$X_{N,b}(k) = \begin{cases} X_{Nsub}(k\%Nsub & \text{for } b\times Nsub \le k < (b+1)\times Nsub \\ 0 & \text{others} \end{cases} \tag{4}$$

$$x_{N,b}(n) = \sum_{k=b\cdot Nsub}^{(b+1)\cdot Nsub-1} X_{Nsub}(k\%Nsub)\cdot W_N^{kn} \tag{5}$$

$$x_{N,b}(n) = \sum_{k=0}^{Nsub-1} X_{Nsub}(k)\cdot W_N^{(k+b\cdot Nsub)n} \tag{6}$$

$$a_{b_1,b_2}(n) = \sum_{m=0}^{N-1} x_{N,b_1}(m)\cdot x^{*}_{N,b_2}(m+n) \tag{7}$$

In signal processing, the cross-correlation (or the cross-correlation function) is a measure of similarity of two series as a function of the displacement of one relative to the other. The cross-correlation is also known as a sliding dot product or sliding inner-product. The cross-correlation is commonly used for searching a long signal for a shorter, known feature. The cross-correlation has applications in pattern recognition, single particle analysis, electron tomography, averaging, cryptanalysis, and neurophysiology. The cross-correlation is similar in nature to the convolution of two functions.

Additionally, or alternatively, $a_{b_1,b_2}(0)$ may satisfy Equation 8 by Parseval's theorem between the time domain and the frequency domain.

$$\begin{aligned} a_{b_1 b_2}(0) &= \sum_{m=0}^{N-1} x_{N,b_1}(m)\cdot x^{*}_{N,b_2}(m) \\ &= \sum_{k=0}^{N-1} X_{N,b_1}(k)\cdot X_{N,b_2}(k) \\ &= \begin{cases} \sum_{k=0}^{Nsub-1} |X_{Nsub}(k)|^2 & \text{for } b_1 = b_2 \\ 0 & \text{others} \end{cases} \end{aligned} \tag{8}$$

Based on the above descriptions and Equations, a training sequence using wideband may be defined based on Equation 9, as the sum of $x_{N,b}(n)$.

$$x_{N,\{B\}}(n) = \sum_{b\in B} x_{N,b}(n) \tag{9}$$

As shown by Equation 10, an arbitrary received signal (or input signal) including $x_{N,\{B\}}(n)$ may have a relationship with respect to a reference signal $x_{N,b}(n)$, and various applications such as synchronization timing and unit band detection may be performed based on such characteristics.

$$|a_{\{B\},b}(n)| = \begin{cases} \alpha & \text{for } n = 0 \text{ and } b \in B \\ 0 & \text{others} \end{cases} \tag{10}$$

A CCF value a(0) obtained by the cross-correlation function may be composed of a complex conjugate multiplication operation without a delay time, so that the same calculation as the matched filtering for several reference signals may be performed.

Additionally, or alternatively, in many communication standards, a training sequence that is repeated in a time domain may be provided to estimate the frequency offset. If an arbitrary training sequence of a length N repeated with N sample intervals is defined as $x_N(n)$, $x_N(n)$ may satisfy Equation 11.

$$x_N(n)=x_N(n-N) \tag{11}$$

If a frequency offset between the transmission and reception systems is $f_o$, the phase change $\varphi(n)$ in the time domain may be represented by Equation 12.

$$\emptyset(n)=\exp(2j\pi f_o n)=\emptyset(n-N)\cdot\exp(2j\pi f_o N) \tag{12}$$

If the other channel distortions are ignored, received signals $y_N(n)$ and $y_N(n-N)$ may be represented by Equation 13 and Equation 14, respectively, and $a_{y_N}(N)$, which is an ACF value of the received signal, may be obtained based on Equation 15.

$$y_N(n) = H\cdot x_N(n)\cdot\emptyset(n)+w(n) \tag{13}$$

$$\begin{aligned} y_N(n-N) &= H\cdot x_N(n-N)\cdot\emptyset(n-N)+w(n-N) \\ &= H\cdot x_N(n)\cdot\emptyset(n)\cdot\exp(-2j\pi f_o N)+w(n-N) \end{aligned} \tag{14}$$

$$\begin{aligned} a_{y_N}(n, N) &= \frac{1}{N}\sum_{m=0}^{N-1} y_N(n)\cdot y_N^*(n-N) \\ &= \gamma\cdot\exp(2j\pi f_o N) \end{aligned} \tag{15}$$

Here, $\gamma$ is a scale value which is any positive number. As shown by Equation 16, a phase change due to the frequency offset of a corresponding sample may be calculated by measuring an angle of a complex value $a_{y_N}(n,N)$.

$$\hat{\emptyset}(n) = \exp\left(\frac{\operatorname{atan}(a_{y_N}(n, N))}{N}\cdot n\right) \tag{16}$$

A result of the matched filtering on the received signal $y_N(n)$ corresponding to the training sequence and a corresponding reference signal $x_N(n)$ may be represented by Equation 17.

$$\begin{aligned} a_{y_N,x_N}(n) &= \left|\frac{1}{N}\sum_{m=0}^{N-1} y_N(m)\cdot x_N^*(m+n)\right| \\ &= \left|\frac{1}{N}\sum_{m=0}^{N-1}(H\cdot x_N(m)\cdot\emptyset(m)+w(m))\cdot x_N^*(m+n)\right| \end{aligned} \tag{17}$$

If a reference signal $x_P(n)$ to which the phase information is reflected is defined based on Equation 18, a new result of the matched filtering may be represented by Equation 19.

$$x_P(n) = x_N(n)\cdot\hat{\emptyset}(n) \tag{18}$$

-continued $$a_{y_N,x_P}(n) = \left|\frac{1}{N}\sum_{m=0}^{N-1}(H\cdot x_N(m)\cdot\emptyset(m)+w(m))\cdot x_N^*(m+n)\cdot\hat{\emptyset}^*(m+n)\right| \tag{19}$$

The above-described result of the matched filtering may have a maximum value when a delay index n=0. For example, as shown by Equation 20, the result of the matched filtering may have a maximum value when w(n)=0.

$$a_{y_N,x_P}(n) = \begin{cases} \dfrac{H}{N}\displaystyle\sum_{m=0}^{N-1}|x_N(m)|^2 & \text{for } n=0,\ w(m)=0 \\ 0 & \text{otherwise} \end{cases} \tag{20}$$

The method of performing synchronization and frequency offset estimation according to example embodiments may be implemented based on the above-described signal modeling and the above-described matched filtering to which the phase information is reflected.

Figure 4:
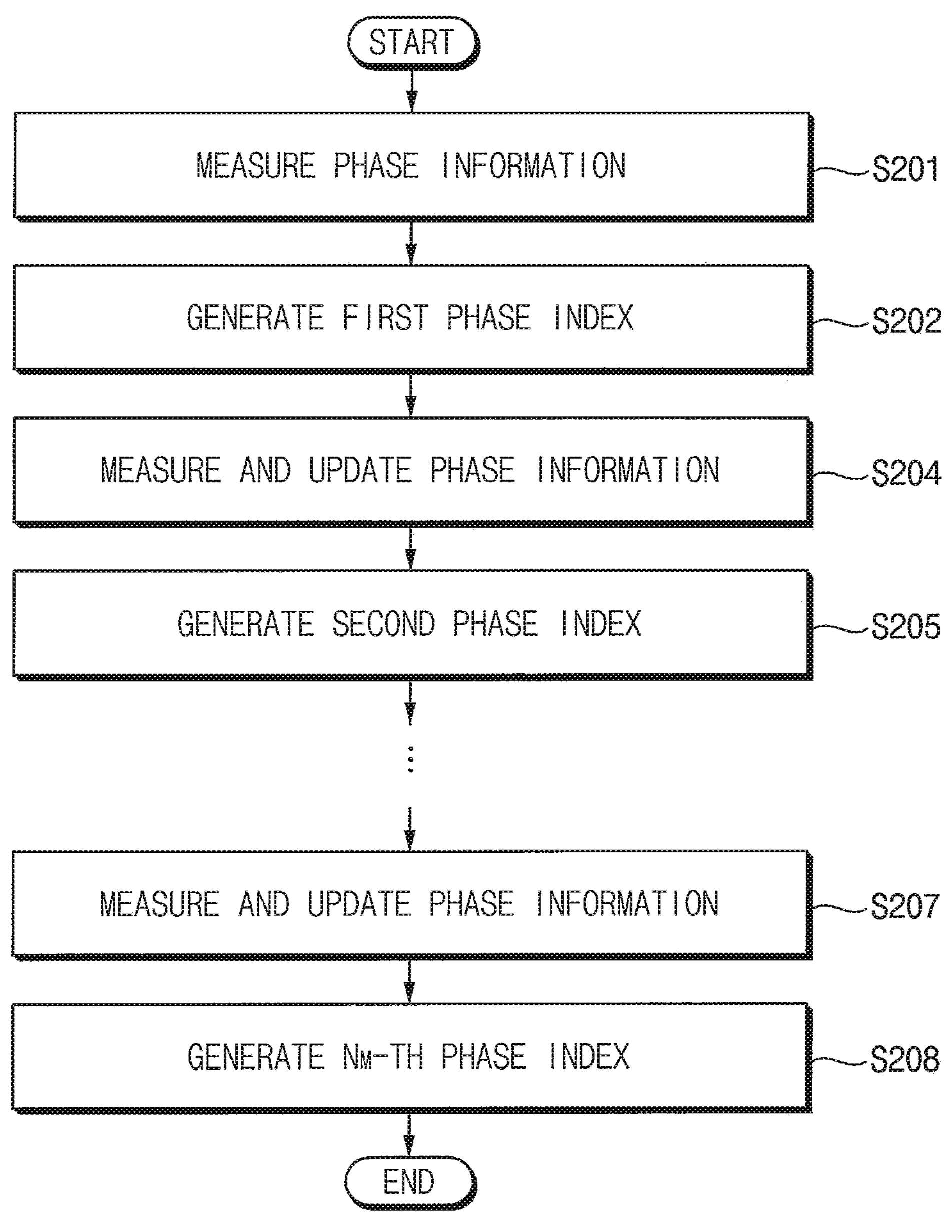
FIGS. 4 and 5 are flowcharts illustrating an example of generating phase information and a phase index in FIG. 1.
Figure 5:
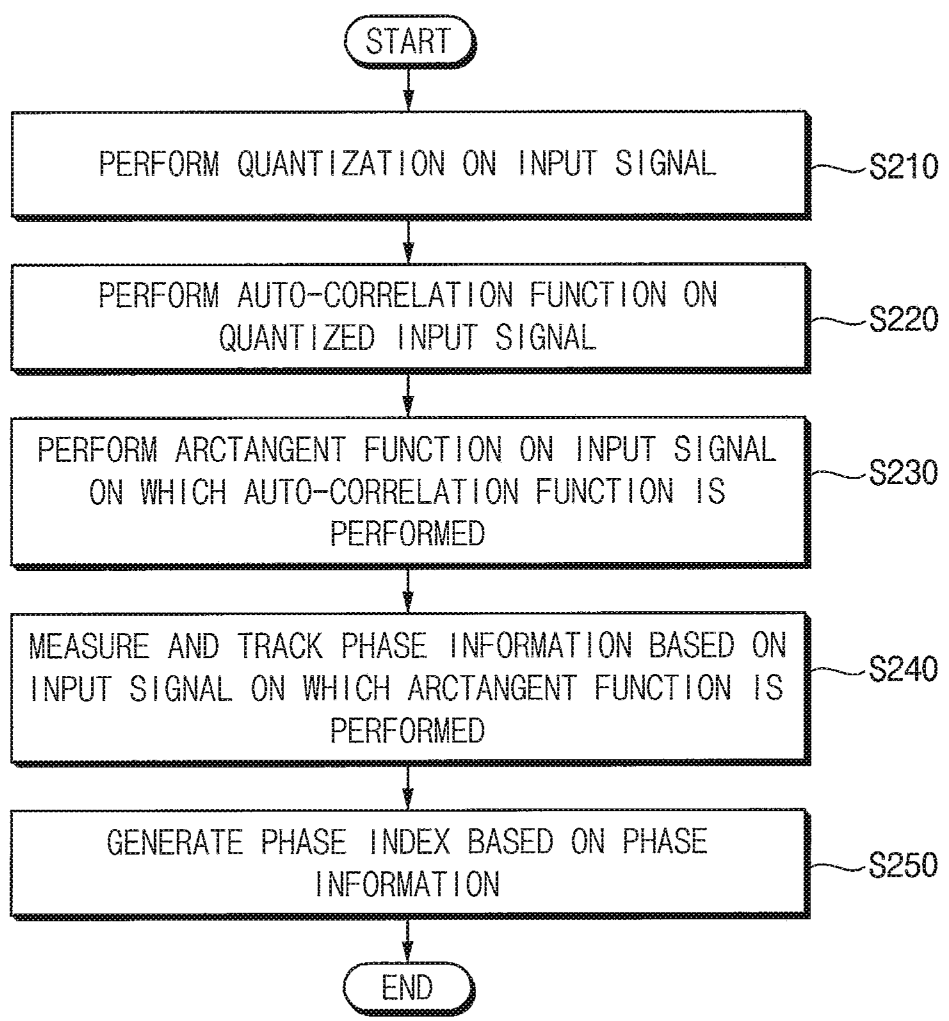

FIGS. 4 and 5 are flowcharts illustrating an example of generating phase information and a phase index in FIG. 1.

Referring to FIGS. 1, 3 and 4, when generating the phase information and the phase index (step S200), phase information (e.g., a delta phase) may be measured based on the first sampling value that corresponds to the first sample index (e.g., "0") and is obtained at the first time point (step S201). A first phase index that corresponds to the first sampling value and the first sample index may be generated based on the phase information measured by step S201 (step S202).

Then, phase information may be measured and updated based on the second sampling value that corresponds to the second sample index (e.g., "1") and is obtained at the second time point (step S204). A second phase index that corresponds to the second sampling value and the second sample index may be generated based on the phase information measured by step S204 (step S205).

Then, phase information may be measured and updated based on the $N_M$-th sampling value that corresponds to the $N_M$-th sample index (e.g., "$N_M-1$") and is obtained at the $N_M$-th time point (step S207). An $N_M$-th phase index that corresponds to the $N_M$-th sampling value and the $N_M$-th sample index may be generated based on the phase information measured by step S207 (step S208).

Referring to FIGS. 1, 2, 3, 4, and 5, a detailed example of generating one phase information and one phase index, is illustrated in FIG. 5. For convenience, an operation of FIG. 5 will be described based on an example where steps S201 and S202 in FIG. 4 are performed.

When generating the phase information and the phase index (step S200), quantization may be performed on the input signal ISIG (step S210). For example, to reduce the computational complexity, the quantization may be performed to a specific level. For example, the quantization may be performed on the first sampling value obtained from the input signal ISIG.

The auto-correlation function may be performed on the quantized input signal (step S220). For example, the auto-correlation function may be calculated based on a delay time that is appropriate or suitable for a structure of the training sequence.

An arctangent (ATAN) function may be performed on the input signal on which the auto-correlation function is performed (step S230). The phase information may be measured and tracked based on the input signal on which the arctangent function is performed (step S240). For example, the phase information may be measured from a result of the auto-correlation function in the form of a complex number, and the phase information may be measured, tracked, and updated by performing an infinite impulse response (IIR) filtering.

The phase index PIDX used to generate the templet signal TEM may be generated based on the phase information (step S250). For example, the first phase index that corresponds to the first sampling value and the first sample index (e.g., "0") may be generated.

The phase index PIDX may be a value corresponding to the phase information. For example, the phase information may have a real number greater than or equal to $-\pi$ and less than or equal to $\pi$ (or greater than or equal to 0 and less than or equal to $2\pi$), and the corresponding phase index PIDX may have an integer greater than or equal to 0 and less than or equal to (K−1), where K is a natural number greater than or equal to two.

As described above, steps S201 and S202 in FIG. 4 may be performed by performing steps S210, S220, S230, S240, and S250 in FIG. 5. Additionally, or alternatively, steps S204 and S205 in FIG. 4 may be similarly performed, and steps S207 and S208 in FIG. 4 may be similarly performed.

Figure 6:
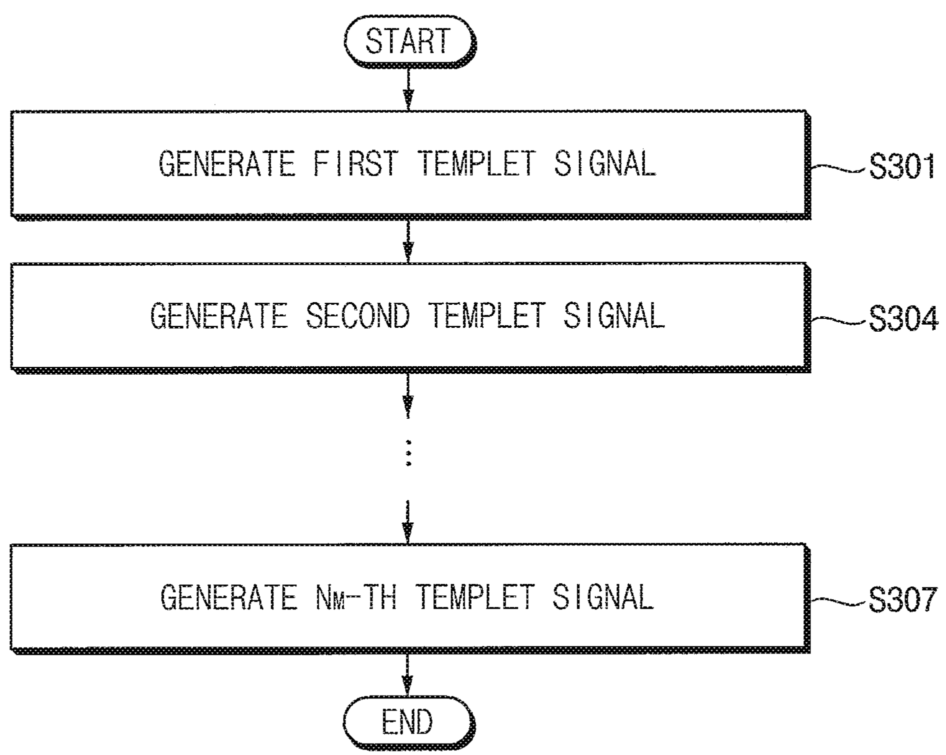
FIGS. 6 and 7 are flowcharts illustrating an example of generating a templet signal in FIG. 1.
Figure 7:
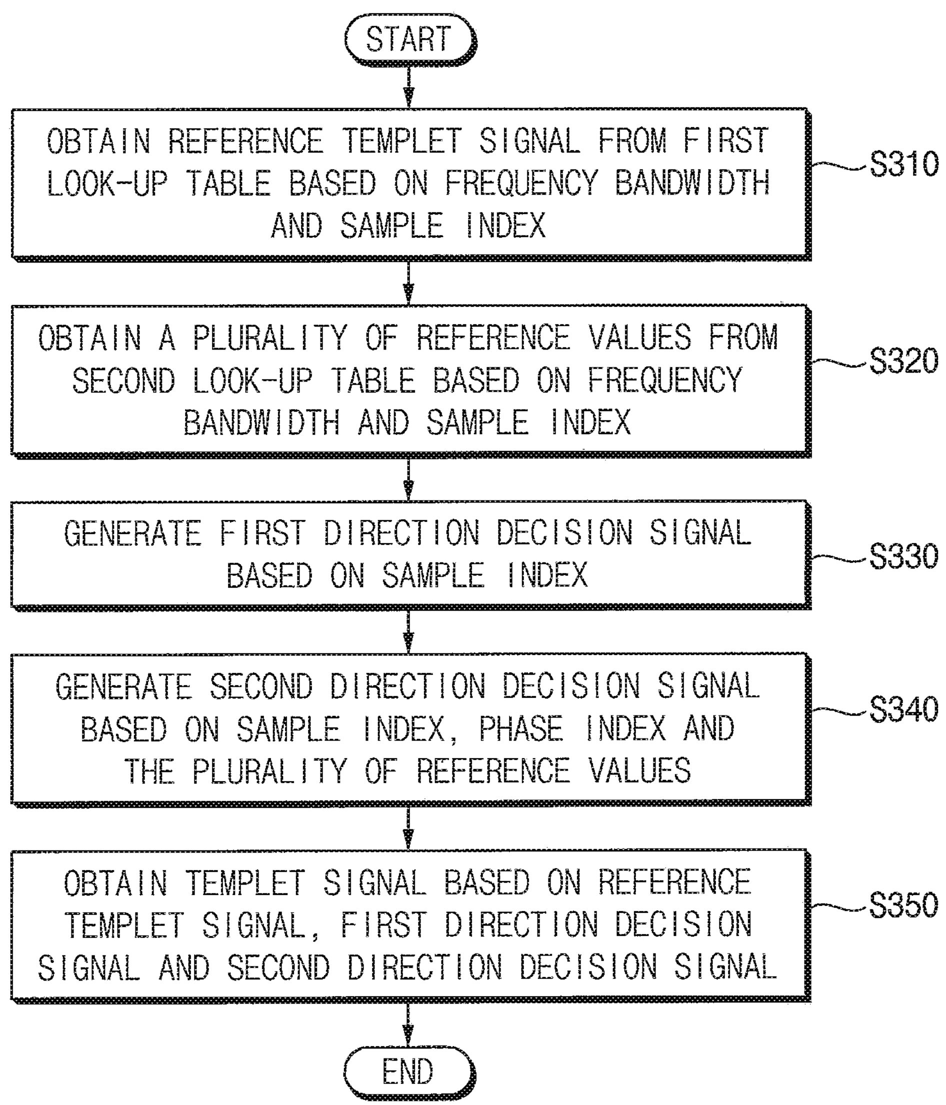

FIGS. 6 and 7 are flowcharts illustrating an example of generating a templet signal in FIG. 1.

Referring to FIGS. 1, 3, 4, and 6, when generating the templet signal associated with the sample index (step S300), a first templet signal associated with the first sample index (e.g., "0") and the first phase index may be generated. The generation of the first templet and first phase index may be based on the at least one look-up table, the first sample index, the first phase index, and the frequency bandwidth of the input signal ISIG (step S301).

Then, a second templet signal associated with the second sample index (e.g., "1") and the second phase index may be generated based on the look-up table, the second sample index, the second phase index, and the frequency bandwidth (step S304).

Then, an $N_M$-th templet signal associated with the $N_M$-th sample index (e.g., "$N_M$−1") and the $N_M$-th phase index may be generated based on the look-up table, the $N_M$-th sample index, the $N_M$-th phase index, and the frequency bandwidth (step S304).

Referring to FIGS. 1, 2, 3, 6, and 7, a detailed example of generating one templet signal is illustrated in FIG. 7. For convenience, an operation of FIG. 7 will be described based on an example where step S301 in FIG. 6 is performed.

When generating the templet signal (step S300), a reference templet signal may be obtained from a first look-up table based on the frequency bandwidth and the sample index SIDX (step S310). For example, the frequency bandwidth and sample index SIDX may be obtained from the input signal ISIG without additional operation. For example, the reference templet signal may be a default or an initial templet signal to which the phase information is not reflected. For example, the first look-up table may include information of the reference templet signal to which the phase information is not reflected.

A plurality of reference values may be obtained from a second look-up table based on the frequency bandwidth and the sample index SIDX (step S320). The second look-up table may be different from the first look-up table. For example, the second look-up table may include information of a step size depending on the phase change corresponding to the phase information. The plurality of reference values may be used to generate a shift index for converting the reference templet signal into the templet signal TEM.

A first direction decision signal may be generated based on the sample index SIDX (step S330). A second direction decision signal may be generated based on the sample index SIDX, the phase index, and the plurality of reference values (step S340). The templet signal TEM may be obtained based on the reference templet signal, the first direction decision signal and the second direction decision signal (step S350). For example, the first templet signal associated with the first sample index (e.g., "0") and the first phase index may be obtained.

As will be described with reference to FIGS. 9, 10, 11A and 11B, the templet signal TEM may be generated by phase-rotating or phase-shifting the reference templet signal based on the phase information. Additionally, or alternatively, the directionality of the phase may be determined to perform the phase-rotation. In the method of performing synchronization and frequency offset estimation according to example embodiments, the directionality of phase may be determined by performing the 2-step operation including steps S330 and S340. Step S330 may be referred to as a primary direction decision operation (or a primary sign direction decision operation), and step S340 may be referred to as a secondary direction decision operation (or a secondary sign direction decision operation).

FIGS. 8A and 8B are diagrams illustrating an example of a look-up table used to perform an operation of FIG. 7.

Referring to FIG. 8A, an example of the first look-up table used in step S310 of FIG. 7 is illustrated.

The reference templet signal may correspond to a complex number, and may include a reference real number part TEM_REF_RE and a reference imaginary number part TEM_REF_IM. The first look-up table may include information of the sample index SIDX, and the reference real number part TEM_REF_RE and the reference imaginary number part TEM_REF_IM that correspond to the sample index SIDX.

For example, when a value of the sample index SIDX is "0", $T_{RE}(0)$ and $T_{IM}(0)$ may be obtained based on the first look-up table as the reference real number part TEM_REF_RE and the reference imaginary number part TEM_REF_IM, respectively, included in the reference templet signal. Similarly, when the value of the sample index SIDX is "1", $T_{RE}(1)$ and $T_{IM}(1)$ may be obtained as the reference real number part TEM_REF_RE and the reference imaginary number part TEM_REF_IM, respectively. When the value of the sample index SIDX is "n", $T_{RE}(n)$ and $T_{IM}(n)$ may be obtained as the reference real number part TEM_REF_RE and the reference imaginary number part TEM_REF_IM, respectively. When the value of the sample index SIDX is "$N_M$−1", $T_{RE}(N_M-1)$ and $T_{IM}(N_M-1)$ may be obtained as the reference real number part TEM_REF_RE and the reference imaginary number part TEM_REF_IM, respectively.

Each of the reference real number part TEM_REF_RE and the reference imaginary number part TEM_REF_IM may have a value corresponding to one of +1, 0, and −1. Additionally, or alternatively, when the phase index PIDX is determined, the reference templet signal with the reference real number part TEM_REF_RE and the reference imaginary number part TEM_REF_IM may be rotated based on the phase index PIDX to be converted into the templet signal TEM.

As with the reference templet signal, the templet signal TEM may correspond to a complex number and may include an output real number part and an output imaginary number part, and each of the output real number part and the output imaginary number part may have a value corresponding to one of +1, 0, and −1.

Referring to FIG. 8B, an example of the second look-up table used in step S320 of FIG. 7 is illustrated.

The second look-up table may include information of the sample index SIDX, and reference values P_STEP_RE1, P_STEP_RE2, P_STEP_IM1 and P_STEP_IM2 that correspond to the sample index SIDX.

For example, when the value of the sample index SIDX is "0", $S_{RE}(0,0)$, $S_{RE}(0,1)$, $S_{IM}(0,0)$ and $S_{IM}(0,1)$ may be obtained based on the second look-up table as the reference values P_STEP_RE1, P_STEP_RE2, P_STEP_IM1 and P_STEP_IM2, respectively. Similarly, when the value of the sample index SIDX is "1", $S_{RE}(1,0)$, $S_{RE}(1,1)$, $S_{IM}(1,0)$ and $S_{IM}(1,1)$ may be obtained as the reference values P_STEP_RE1, P_STEP_RE2, P_STEP_IM1 and P_STEP_IM2, respectively. When the value of the sample index SIDX is "n", $S_{RE}(n,0)$, $S_{RE}(n,1)$, $S_{IM}(n,0)$ and $S_{IM}(n,1)$ may be obtained as the reference values P_STEP_RE1, P_STEP_RE2, P_STEP_IM1 and P_STEP_IM2, respectively. When the value of the sample index SIDX is "$N_M$−1", $S_{RE}(N_M-1,0)$, $S_{RE}(N_M-1,1)$, $S_{IM}(N_M-1,0)$ and $S_{IM}(N_M-1,1)$ may be obtained as the reference values P_STEP_RE1, P_STEP_RE2, P_STEP_IM1 and P_STEP_IM2, respectively.

A process of calculating the templet signal TEM in real-time (or in online or during runtime) may be a very complex process. Even if the templet signal TEM is obtained using the look-up table, implementing some or all possible cases of the look-up table may be difficult. In the method of performing synchronization and frequency offset estimation according to example embodiments, the templet signal TEM, which is a final templet signal to which the phase information is reflected, may be reconstructed or restored by a simple indexing process from minimum reference signal sets using the first and second look-up tables with a relatively simple structure. Therefore, the computational complexity and the size of the look-up table may be reduced.

FIGS. 9, 10, 11A and 11B are diagrams for describing an operation of FIG. 7.

Figure 9:
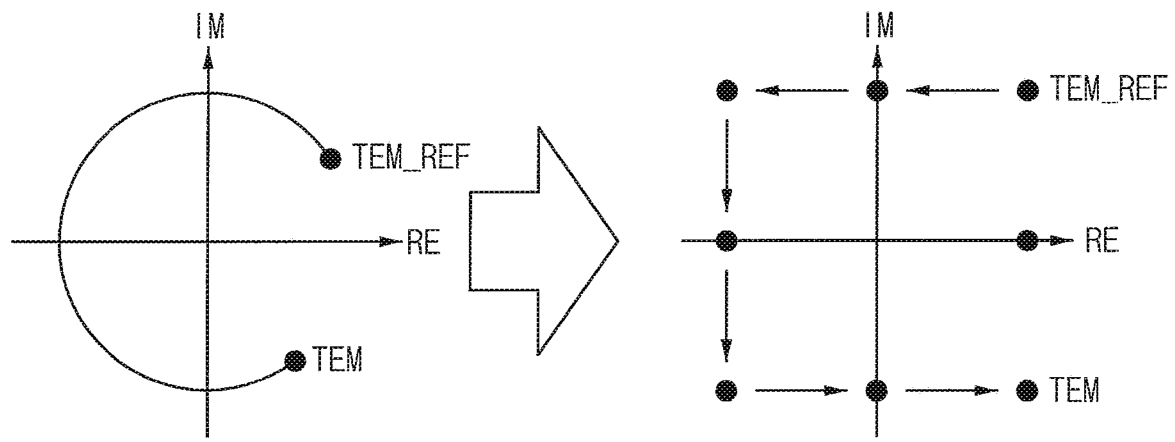
FIGS. 9, 10, 11A and 11B are diagrams for describing an operation of FIG. 7.
Figure 10:
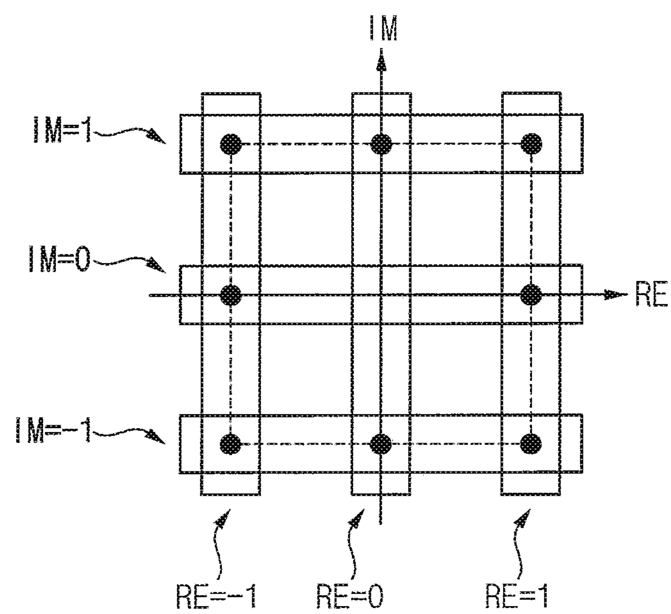

Referring to FIGS. 9 and 10, a reference templet signal TEM_REF and the templet signal TEM, which is a final templet signal to which the phase information is reflected, are illustrated.

Each of the reference templet signal TEM_REF and the templet signal TEM may be disposed or located on a complex number plane. As illustrated on the left side of FIG. 9, the templet signal TEM may be generated by phase-shifting the reference templet signal TEM_REF based on the phase information. As illustrated on the right side of FIG. 9, to reduce the computational complexity, each of the reference templet signal TEM_REF and the templet signal TEM may be mapped on or onto ternary lattice (or grid) coordinates formed on the complex number plane. The templet signal TEM may be obtained by shifting the reference templet signal on the ternary lattice coordinates based on the phase index PIDX.

As described with reference to FIG. 8A, the reference templet signal TEM_REF may include the reference real number part TEM_REF_RE and a reference imaginary number part TEM_REF_IM. When the reference templet signal TEM_REF is mapped on the ternary lattice coordinates, each of the reference real number part TEM_REF_RE and the reference imaginary number part TEM_REF_IM may have the value corresponding to one of +1, 0, and −1.

In other words, the reference templet signal TEM_REF may be determined as one of nine complex numbers illustrated in FIG. 10.

The reference templet signal TEM_REF may be rotated on the ternary lattice coordinates based on the phase index PIDX, and each of the reference real number part TEM_REF_RE and the reference imaginary number part TEM_REF_IM may have a predetermined conversion order, such as "1"→"0"→"−1"→"0"→"1"→"0"→ . . . , depending on the ternary characteristic. For example, when a value of the reference real number part TEM_REF_RE or a value of the reference imaginary number part TEM_REF_IM is "1" or "−1", and when the shift index is determined, the output real number part or the output imaginary number part included in the templet signal TEM may be determined based on the predetermined conversion order. When the value of the reference real number part TEM_REF_RE or the value of the reference imaginary number part TEM_REF_IM is "0", the output real number part or the output imaginary number part included in the templet signal TEM may be determined based on the predetermined conversion order and based on a cross-checking of the reference real number part TEM_REF_RE and the reference imaginary number part TEM_REF_IM.

For example, when the value of the reference real number part TEM_REF_RE is "1" and when a real number part shift index associated with the reference real number part TEM_REF_RE is "1", the output real number part included in the templet signal TEM may be determined to be "0" shifted from "1" by one (e.g., "−1"→"0"), based on the predetermined conversion order. When the value of the reference imaginary number part TEM_REF_IM is "−1" and when an imaginary number part shift index associated with the reference imaginary number part TEM_REF_IM is "2", the output imaginary number part included in the templet signal TEM may be determined to be "1" shifted from "−1" by two (e.g., "−1"→"0"→"1"), based on the predetermined conversion order. When the value of the reference real number part TEM_REF_RE is "0" and when the real number part shift index is "1", the output real number part may be determined as "1" or "−1" shifted from "0" by one (e.g., "0"→"1" or "0"→"−1"), based on the predetermined conversion order, and the cross-checking may be used to determine the output real number part.

To determine the output real number part and the output imaginary number part included in the templet signal TEM as described above, the 2-step operation including the primary direction decision operation and the secondary direction decision operation may be performed as described with reference to FIG. 7.

The first direction decision signal generated by step S330 in FIG. 7 may be obtained based on Equation 21.

$$D(n) = \begin{cases} +j & \text{when } 0 \le n < N/2 \\ -j & \text{when } N/2 \le n < N \end{cases} \tag{21}$$

In Equation 21, D(n) denotes the first direction decision signal, and n denotes the sample index SIDX. For convenience of calculation, D(n) is represented as an imaginary number. The sample index SIDX may be in a range greater than or equal to zero and less than N, where N is a natural number greater than or equal to two, and N may denote a length of the templet signal TEM. For example, $N=N_M-1$.

Next, the second direction decision signal generated by step S340 in FIG. 7 may include the real number part shift index and the imaginary number part shift index, and the real number part shift index and the imaginary number part shift index may be obtained based on Equation 22 and Equation 23.

$$\mathrm{SHIFT}_{RE}(k,n)=\begin{cases}0 & \text{when } k<S_{RE}(n,0)\\ 1 & \text{when } S_{RE}(n,0)\le k<S_{RE}(n,1)\\ 2 & \text{others}\end{cases} \tag{22}$$

[Equation 23]

$$\mathrm{SHIFT}_{IM}(k,n)=\begin{cases}0 & \text{when } k<S_{IM}(n,0)\\ 1 & \text{when } S_{IM}(n,0)\le k<S_{IM}(n,1)\\ 2 & \text{others}\end{cases} \tag{23}$$

In Equation 22 and Equation 23, $\mathrm{SHIFT}_{RE}(k,n)$ denotes the real number part shift index, $\mathrm{SHIFT}_{IM}(k,n)$ denotes the imaginary number part shift index, k denotes the phase index PIDX, and $S_{RE}(n,0)$, $S_{RE}(n,1)$, $S_{IM}(n,0)$ and $S_{IM}(n,1)$ denote the plurality of reference values P_STEP_RE1, P_STEP_RE2, P_STEP_IM1 and P_STEP_IM2.

The output real number part and the output imaginary number part included in the templet signal TEM generated by step S350 in FIG. 7 may be obtained based on Equation 24, Equation 25 and Equation 26.

$$T_{P,RE}(k,n)=\begin{cases}\mathrm{RE}\{T_{COMP}(n)\cdot D(n)^{SHIFT_{RE}(k,n)}\} & \text{when } T_{RE}(n)=0\\ \mathrm{RE}\{T_{RE}(n)\cdot D(n)^{SHIFT_{RE}(k,n)}\} & \text{other}\end{cases} \tag{24}$$

$$T_{P,IM}(k,n)=\begin{cases}\mathrm{IM}\{T_{COMP}(n)\cdot D(n)^{SHIFT_{IM}(k,n)}\} & \text{when } T_{IM}(n)=0\\ \mathrm{RE}\{T_{IM}(n)\cdot D(n)^{SHIFT_{IM}(k,n)}\} & \text{other}\end{cases} \tag{25}$$

$$T_{COMP}(n)=T_{RE}(n)+T_{IM}(n)\cdot j \tag{26}$$

In Equation 24, Equation 25 and Equation 26, $T_{P,RE}(k,n)$ denotes the output real number part, $T_{P,IM}(k,n)$ denotes the output imaginary number part, $T_{RE}(n)$ denotes the reference real number part TEM_REF_RE, $T_{IM}(n)$ denotes the reference imaginary number part TEM_REF_IM, RE{•} denotes a function of obtaining a real number part, and IM{•} denotes a function of obtaining an imaginary number part.

Figure 11A:
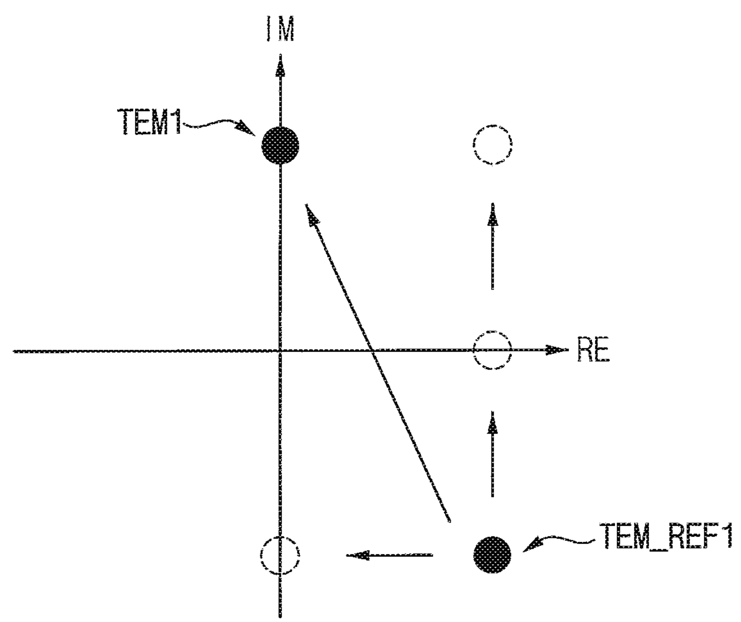
Figure 11B:
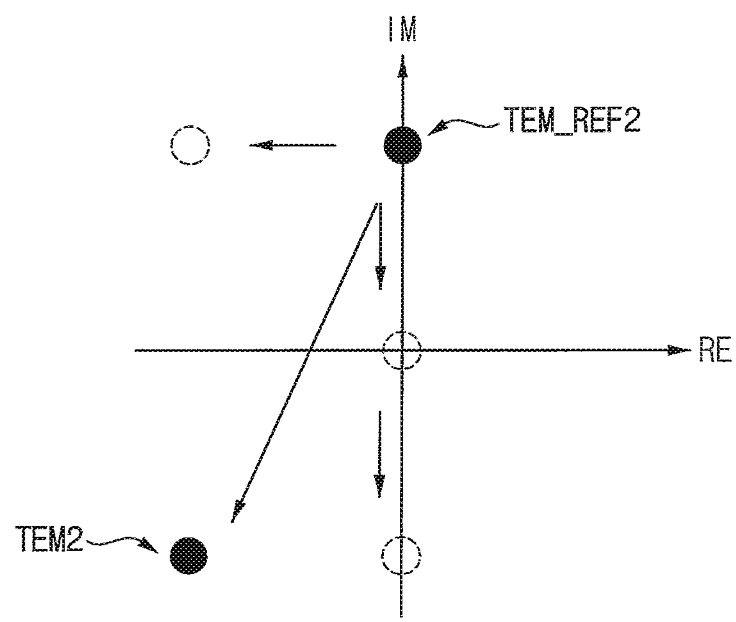

Referring to FIGS. 11A and 11B, examples of converting the reference templet signal into the templet signal are illustrated. For example, the reference templet signal may be converted into the templet signal based on the first and second look-up tables of FIGS. 8A and 8B, the operation of mapping using the ternary lattice coordinates described with reference to FIGS. 9 and 10, and Equation 21 through Equation 26. In examples of FIGS. 11A and 11B, n<2/N, k=150, and K=256.

In an example of FIG. 11A, when $T_{RE}(n)=1$ and $T_{IM}(n)=-1$, a reference templet signal TEM_REF1 may be mapped on the ternary lattice coordinates formed on the complex number plane as illustrated. When n<2/N, D(n)=j. When $S_{RE}(n,0)=120$ and $S_{RE}(n,1)=180$, $S_{RE}(n,0)<k<S_{RE}(n,1)$ and $\mathrm{SHIFT}_{RE}(k,n)=1$. When $S_{IM}(n,0)=70$ and $S_{IM}(n,1)=120$, $S_{IM}(n,1)<k$, and thus $\mathrm{SHIFT}_{IM}(k,n)=2$. It may then be obtained that $T_{P,RE}(k,n)=0$ and $T_{P,IM}(k,n)=1$, and thus a templet signal TEM1 may be mapped on the ternary lattice coordinates formed on the complex number plane as illustrated In an example of FIG. 11B, when $T_{RE}(n)=0$ and $T_{IM}(n)=1$, a reference templet signal TEM_REF2 may be mapped on the ternary lattice coordinates formed on the complex number plane as illustrated. As with that described with reference to FIG. 11A, D(n)=j, $\mathrm{SHIFT}_{RE}(k,n)=1$, and $\mathrm{SHIFT}_{IM}(k,n)=2$. It may then be obtained that $T_{P,RE}(k,n)=-1$ and $T_{P,IM}(k,n)=-1$. Therefore, a templet signal TEM2 may be mapped on the ternary lattice coordinates formed on the complex number plane, as illustrated In other words, in examples of FIGS. 11A and 11B, the templet signals TEM1 and TEM2 may be generated by phase-shifting the reference templet signals TEM_REF1 and TEM_REF2, respectively, based on the phase index "k". Each of the templet signals TEM1 and TEM2 may correspond to the reference signal $x_P(n)$ to which the phase information is reflected, described with reference to Equation 18 through Equation 20.

Figure 12:
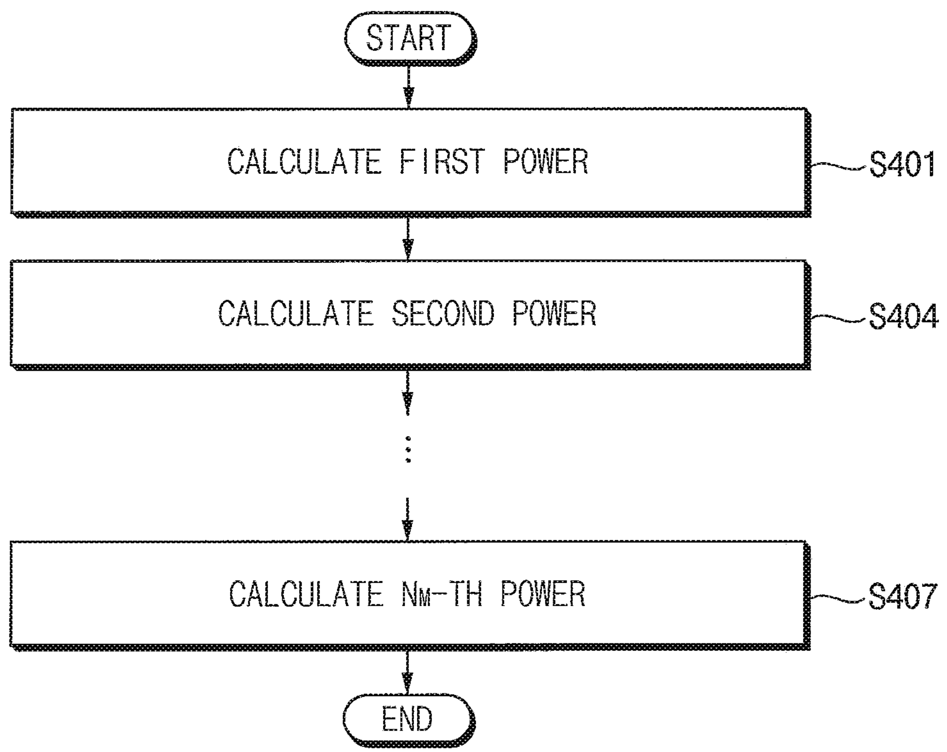
FIGS. 12, 13 and 14 are flowcharts illustrating an example of calculating power and an example of simultaneously determining a synchronization timing and a frequency offset in FIG. 1.
Figure 13:
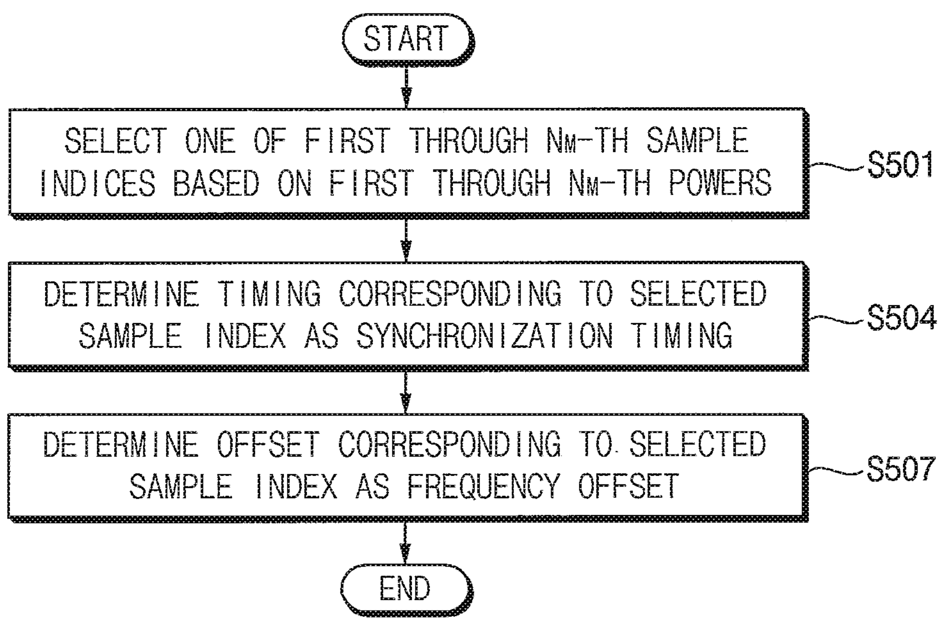
Figure 14:
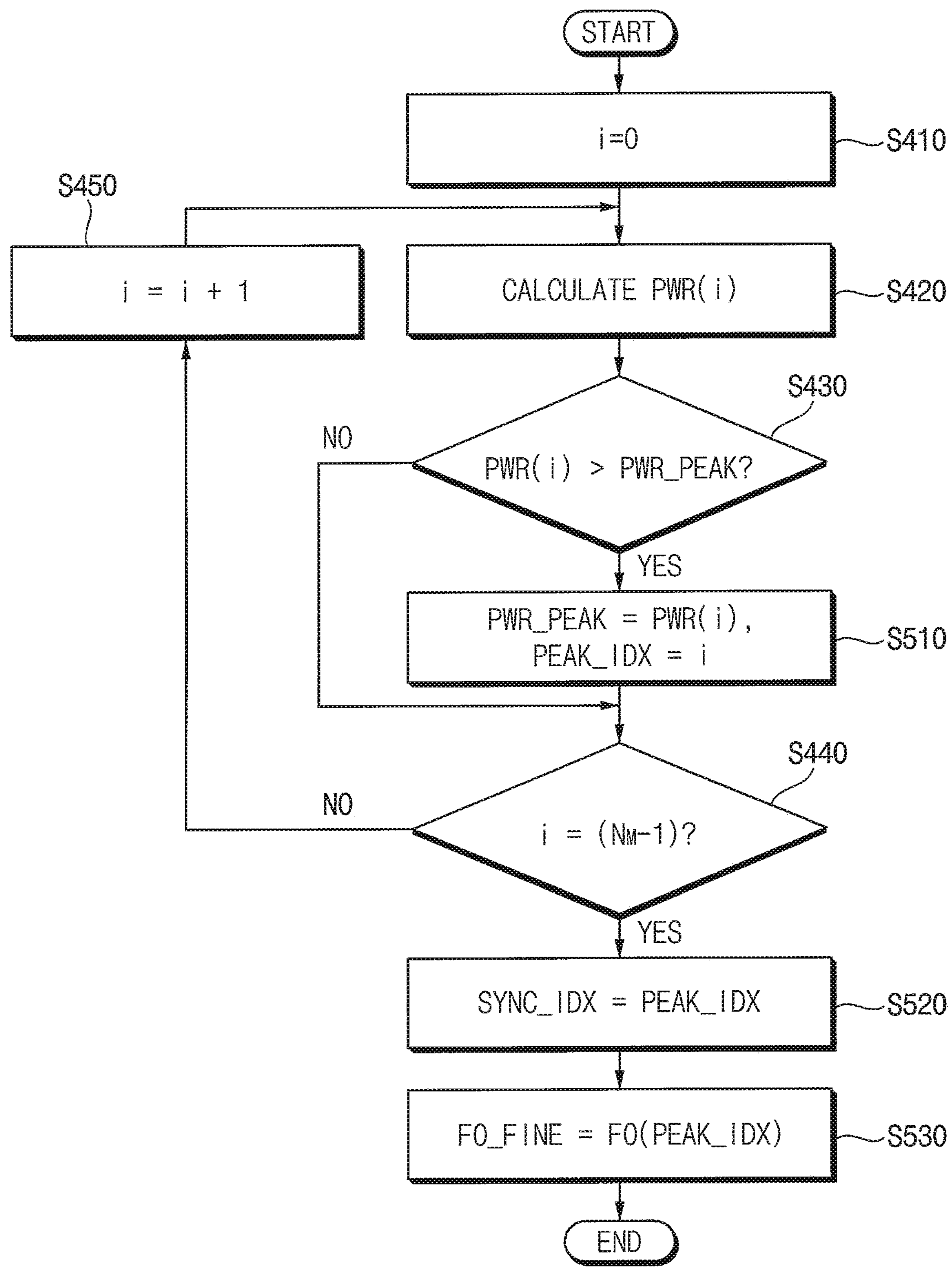

FIGS. 12, 13, and 14 are flowcharts illustrating an example of calculating power and an example of simultaneously determining a synchronization timing and a frequency offset in FIG. 1.

Referring to FIGS. 1, 3, and 12, when calculating the power associated with the sample index (step S400), a first power associated with the first sample index (e.g., "0") may be calculated (step S401). Then, a second power associated with the second sample index (e.g., "1") may be calculated (step S404). After that, $N_M$-th power associated with the $N_M$-th sample index (e.g., "$N_M-1$") may be calculated (step S407).

Referring to FIGS. 1, 3, 12, and 13, when simultaneously determining the synchronization timing and the frequency offset for the input signal (step S500), one of the first through $N_M$-th sample indices (e.g., "0", "1", . . . , "$N_M-1$") may be selected based on the first through $N_M$-th powers (step S501). A timing corresponding to the selected sample index (e.g., the selected one from among the first through $N_M$-th sample indices) may be determined as the synchronization timing (step S504). An offset corresponding to the selected sample index may be determined as the frequency offset (step S507).

In some example embodiments, power corresponding to the selected sample index may be the greatest power among the first through $N_M$-th powers.

Referring to FIGS. 1, 2, and 14, a detailed example of selecting the sample index corresponding to the maximum power and a detailed example of determining the synchronization timing and the frequency offset based on the selected sample index are illustrated in FIG. 14.

When calculating the power (step S400) and simultaneously determining the synchronization timing and the frequency offset (step S500), a power calculation and a selection may be performed on an i-th sample index, where i is an integer greater than or equal to zero.

For example, at an initial operation time, "i" may be set to zero (step S410), and i-th power PWR(i) associated with the i-th sample index may be calculated (step S420). For example, the power calculation may be performed by a wideband matched filtering using the templet signal TEM to which the phase information is reflected, and the cross-correlation function may be performed.

When the i-th power PWR(i) calculated by step S420 is greater than the maximum power PWR_PEAK (step S430: YES), the maximum power PWR_PEAK may be updated to the i-th power PWR(i), a maximum power index PEAK_IDX corresponding to the maximum power PWR_PEAK may be updated to "i" (step S510). When the i-th power PWR(i) is less than or equal to the maximum power PWR_PEAK (step S430: NO), step S510 may be omitted.

When "i" is less than "$N_M-1$" (step S440: NO), "i" may be increased by one (step S450), and steps S420, S430, and S510 may be repeated.

When "i" is equal to "$N_M$-1" (step S440: YES), e.g., when some or all of the first through $N_M$-th powers associated with the first through $N_M$-th sample indices are calculated, the maximum power index PEAK_IDX corresponding to the maximum power PWR_PEAK may be determined as a synchronization timing index SYNC_IDX corresponding to the synchronization timing SYNC (step S520). Additionally, or alternatively, an offset FO(PEAK_IDX) corresponding to the maximum power index PEAK_IDX may be determined as a final frequency offset FO_FINE (step S530).

Figure 15:
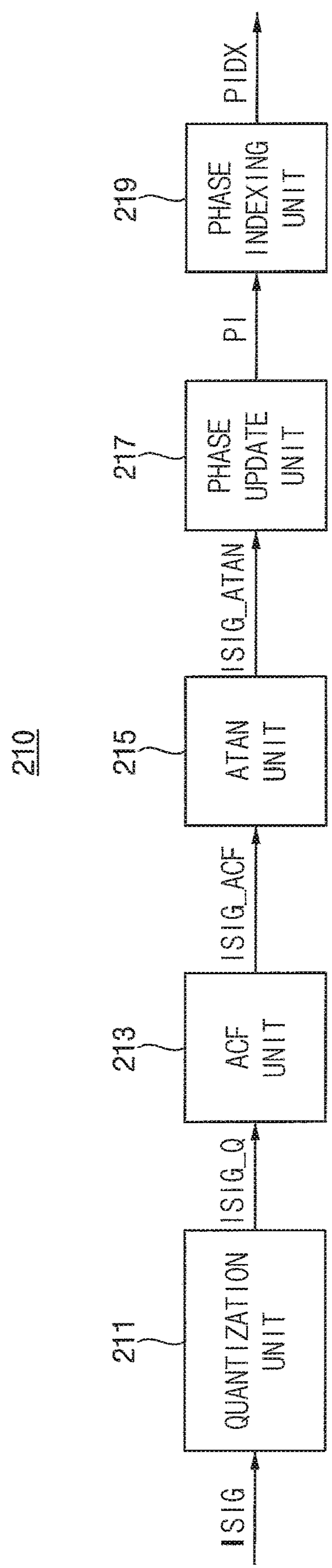
FIG. 15 is a block diagram illustrating an example of a first calculator included in a receiver according to example embodiments.

FIG. 15 is a block diagram illustrating an example of a first calculator included in a receiver according to example embodiments.

Referring to FIG. 15, the first calculator 210 may include a quantization unit 211, an auto-correlation function unit 213, an arctangent unit 215, a phase update unit 217 and a phase indexing unit 219.

The quantization unit 211 may perform the quantization on the input signal ISIG. In other words, the quantization unit 211 may perform step S210 in FIG. 5.

The auto-correlation function unit 213 may perform the auto-correlation function on the quantized input signal ISIG_Q. In other words, the auto-correlation function unit 213 may perform step S220 in FIG. 5.

The arctangent unit 215 may perform the arctangent function on the input signal ISIG_ACF on which the auto-correlation function is performed. In other words, the arctangent unit 215 may perform step S230 in FIG. 5.

The phase update unit 217 may measure and track the phase information PI based on the input signal ISIG_ATAN on which the arctangent function is performed. In other words, the phase update unit 217 may perform step S240 in FIG. 5.

The phase indexing unit 219 may generate the phase index PIDX based on the phase information PI. In other words, the phase indexing unit 219 may perform step S250 in FIG. 5.

Figure 16:
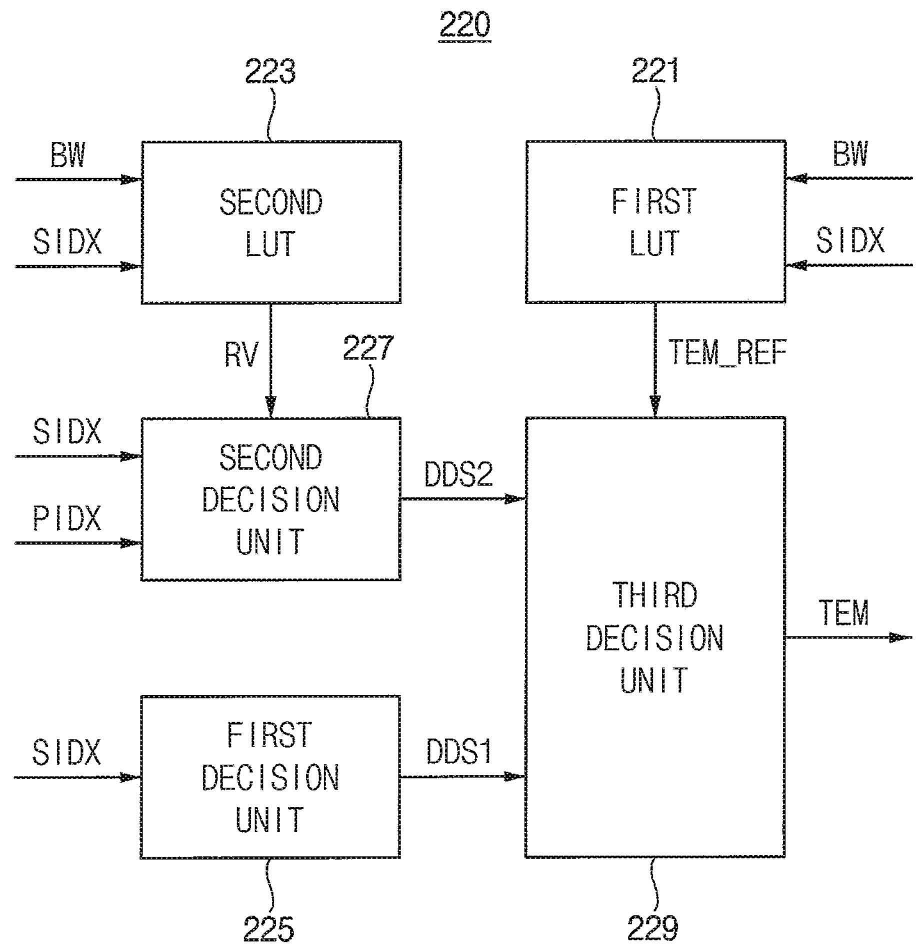
FIG. 16 is a block diagram illustrating an example of a templet generator included in a receiver according to example embodiments.

FIG. 16 is a block diagram illustrating an example of a templet generator included in a receiver according to example embodiments.

Referring to FIG. 16, the templet generator 220 may include a first look-up table 221, a second look-up table 223, a first decision unit 225, a second decision unit 227, and a third decision unit 229.

The first look-up table 221 may store the reference templet signal TEM_REF, and may output the reference templet signal TEM_REF based on the frequency bandwidth BW and the sample index SIDX. In other words, step S310 in FIG. 7 may be performed based on the first look-up table 221.

The second look-up table 223 may be different from the first look-up table 221, may store the plurality of reference values RV, and may output the plurality of reference values RV based on the frequency bandwidth BW and the sample index SIDX. In other words, step S320 in FIG. 7 may be performed based on the second look-up table 223.

In some example embodiments, sizes of the first look-up table 221 and the second look-up table 223 may be proportional to the frequency bandwidth BW.

The first decision unit 225 may generate the first direction decision signal DDS1 based on the sample index SIDX. In other words, the first decision unit 225 may perform step S330 in FIG. 5.

The second decision unit 227 may generate the second direction decision signal DDS2 based on the sample index SIDX, the phase index PIDX and the plurality of reference values RV. In other words, the second decision unit 227 may perform step S340 in FIG. 5.

The third decision unit 229 may output the templet signal TEM based on the reference templet signal TEM_REF, the first direction decision signal DDS1 and the second direction decision signal DDS2. In other words, the third decision unit 229 may perform step S350 in FIG. 5.

Figure 17:
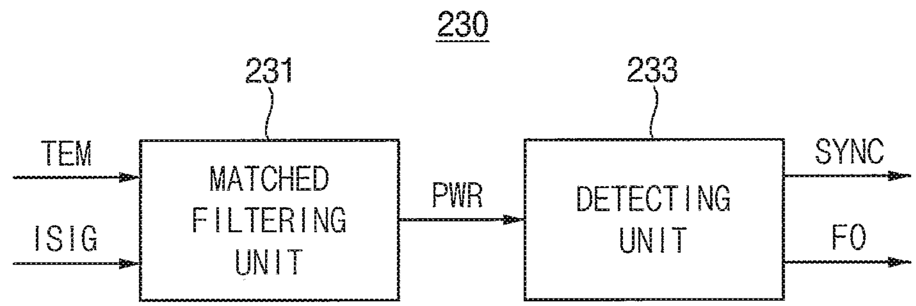
FIG. 17 is a block diagram illustrating an example of a second calculator included in a receiver according to example embodiments.

FIG. 17 is a block diagram illustrating an example of a second calculator included in a receiver according to example embodiments.

Referring to FIG. 17, the second calculator 230 may include a matched filtering unit 231 and a detecting unit 233.

The matched filtering unit 231 may calculate the power PWR associated with the input signal ISIG based on the input signal ISIG and the templet signal TEM. For example, the matched filtering unit 231 may calculate the first through $N_M$-th powers associated with the first through $N_M$-th sample indices that are included in the input signal ISIG. In other words, the matched filtering unit 231 may perform steps S401, S404 and S407 in FIG. 12 and step S420 in FIG. 14.

In some example embodiments, the quantized input signal ISIG_Q may be provided to the matched filtering unit 231 instead of the input signal ISIG.

The detecting unit 233 may select one of the first through $N_M$-th sample indices based on the first through $N_M$-th powers, may determine the timing corresponding to the selected sample index as the synchronization timing SYNC, and may determine the offset corresponding to the selected sample index as the frequency offset FO. In other words, the detecting unit 233 may perform steps S501, S504 and S507 in FIG. 13 and steps S520 and S530 in FIG. 14.

FIGS. 18, 19A, 19B, 20, 21A, 21B, 22A and 22B are diagrams for describing operations of a receiver and a wireless communication system according to example embodiments.

Figure 18:
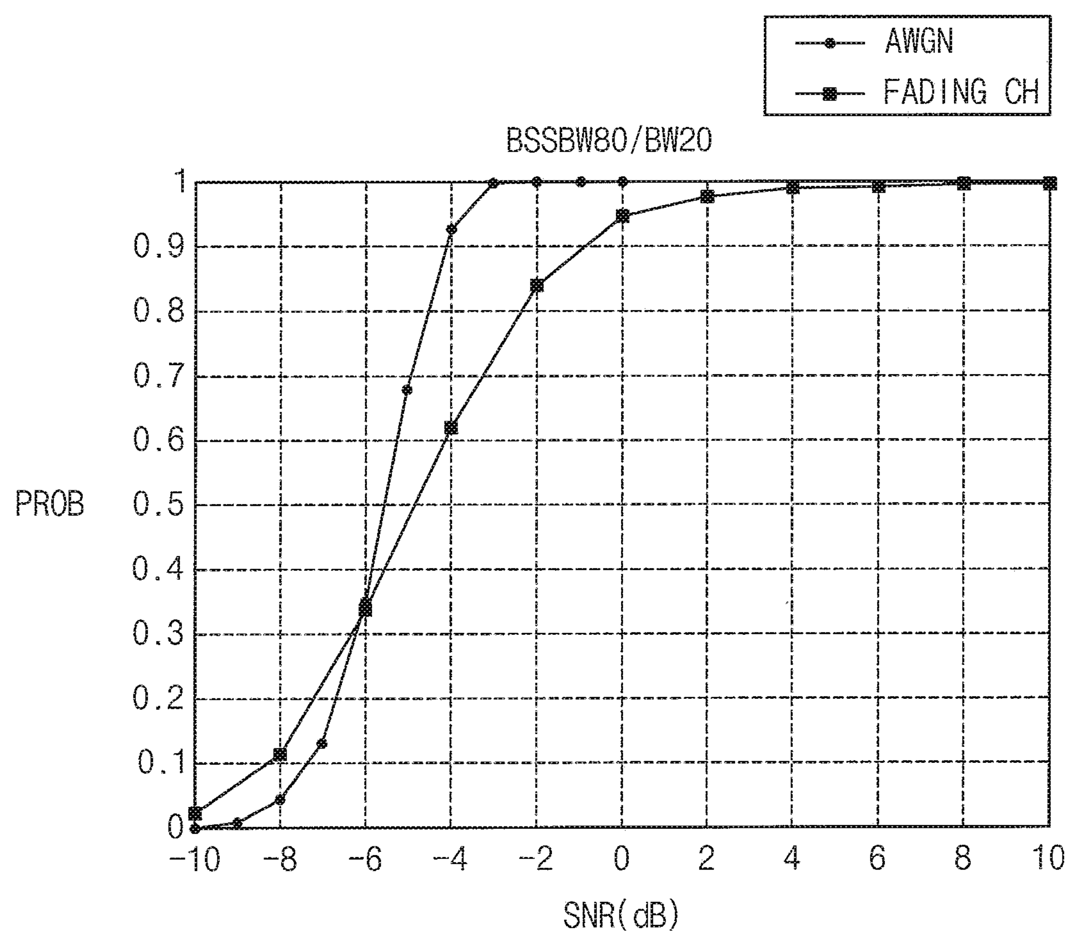
FIGS. 18, 19A, 19B, 20, 21A, 21B, 22A and 22B are diagrams for describing operations of a receiver and a wireless communication system according to example embodiments.

Referring to FIG. 18, the accuracy of detecting the synchronization timing is illustrated when example embodiments are applied to an additive white Gaussian noise (AWGN) channel and a fading channel. It can be seen that good results are shown in a general operating region.

Figure 19A:
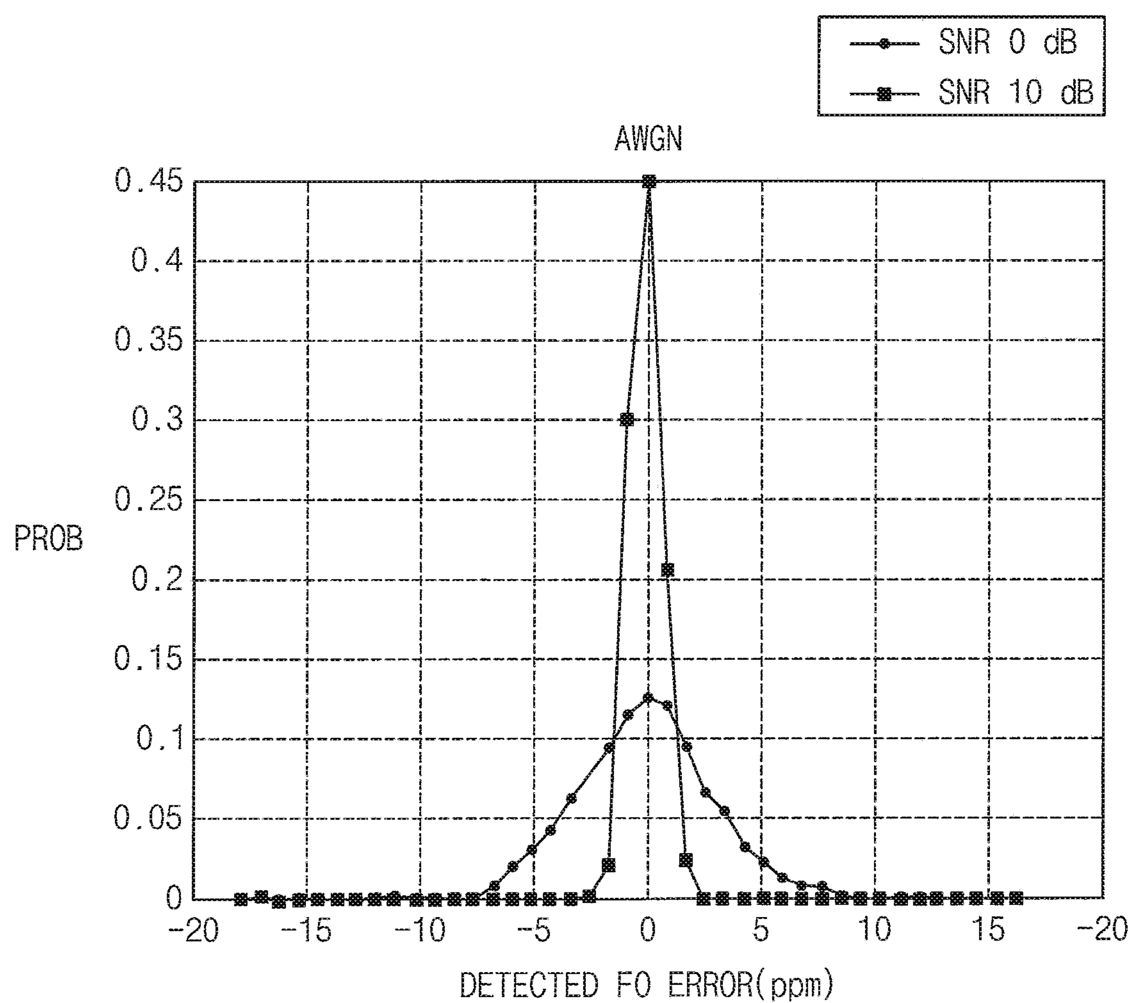
Figure 19B:
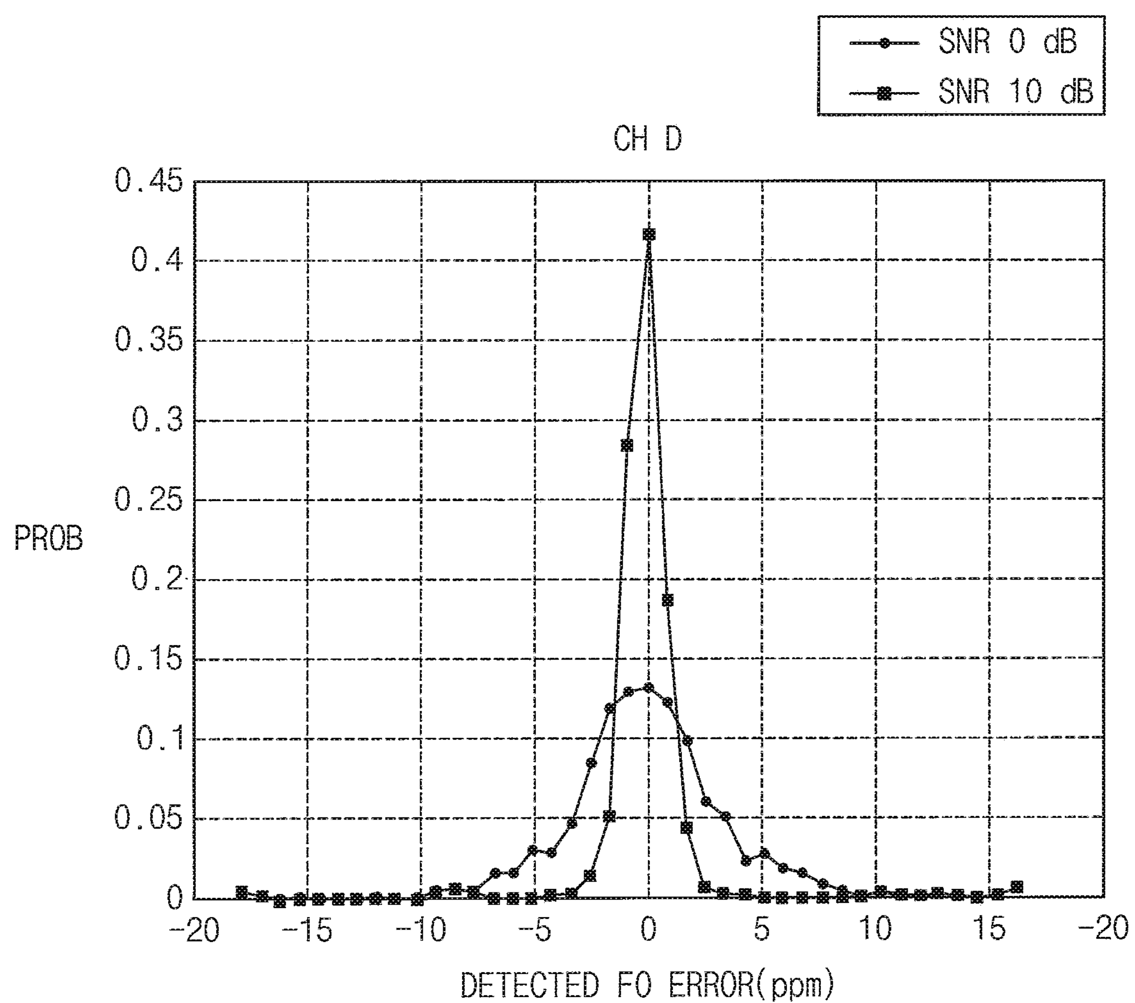

Referring to FIGS. 19A and 19B, results estimated from the received signal with a frequency offset distortion of about 20 ppm (=100 kHz) in the transmission frequency band of about 5 GHz are illustrated depending on the signal-to-noise ratio (SNR) in the AWGN channel and the fading channel (e.g., CH D). The accuracy of the estimated frequency offset may be affected by the accuracy of detecting the synchronization timing depending on the characteristics of the OFDM-based communication system.

Figure 20:
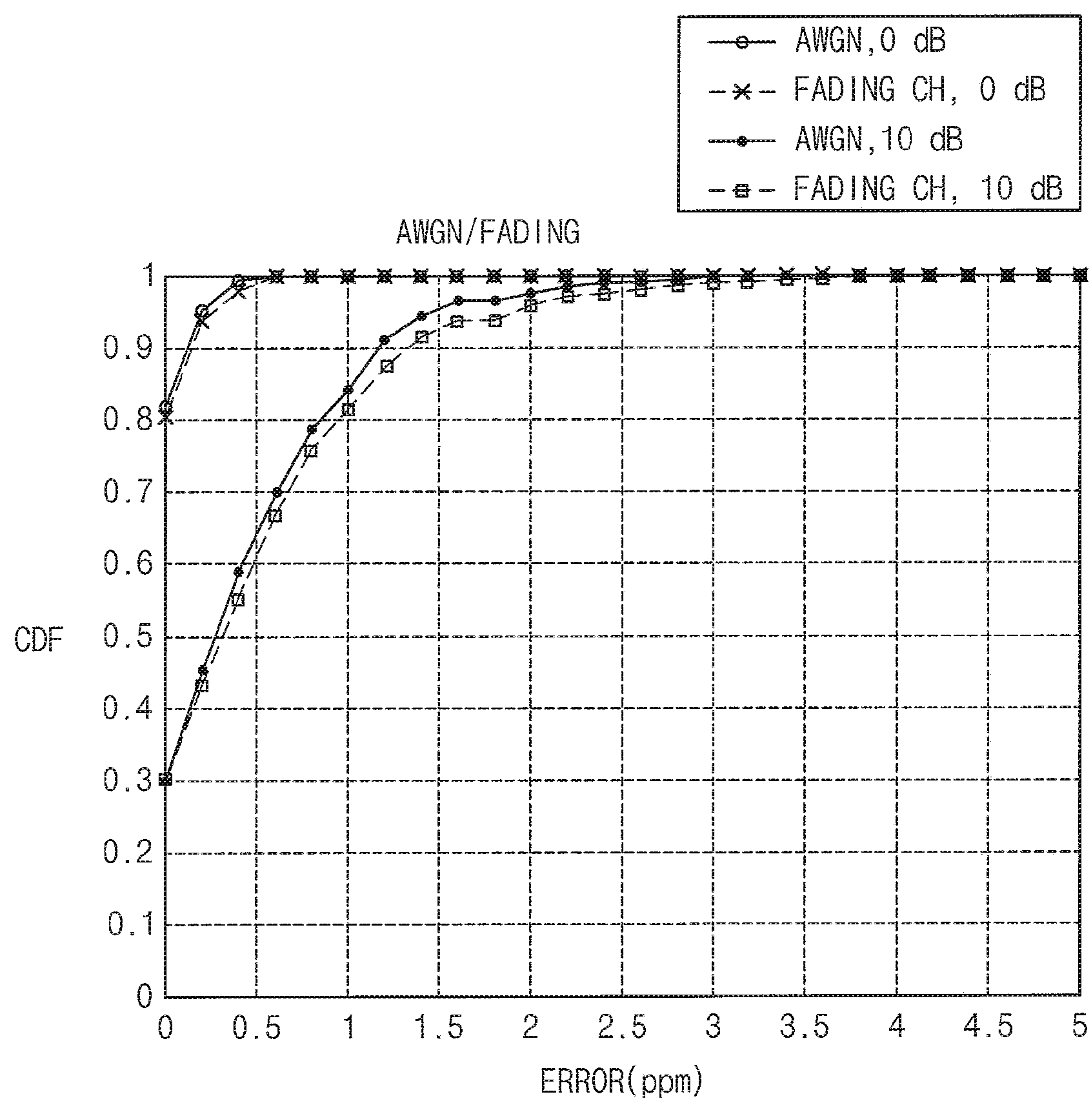

Referring to FIG. 20, the distribution of the accuracy of the estimated frequency offset is represented depending on the error range. Although the accuracy of the estimated frequency offset is degraded in the low SNR region, the accuracy may be within the target SNR and may not significantly affect the reception performance.

Figure 21A:
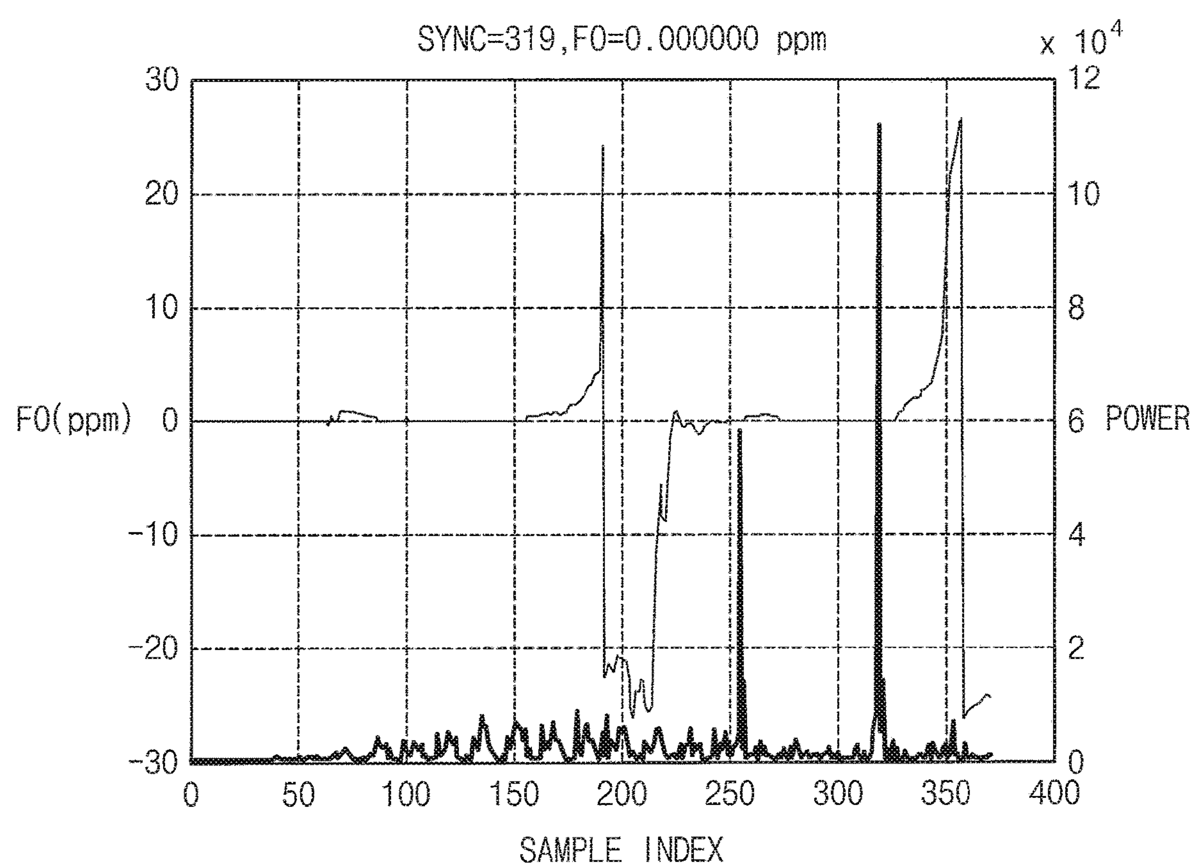
Figure 21B:
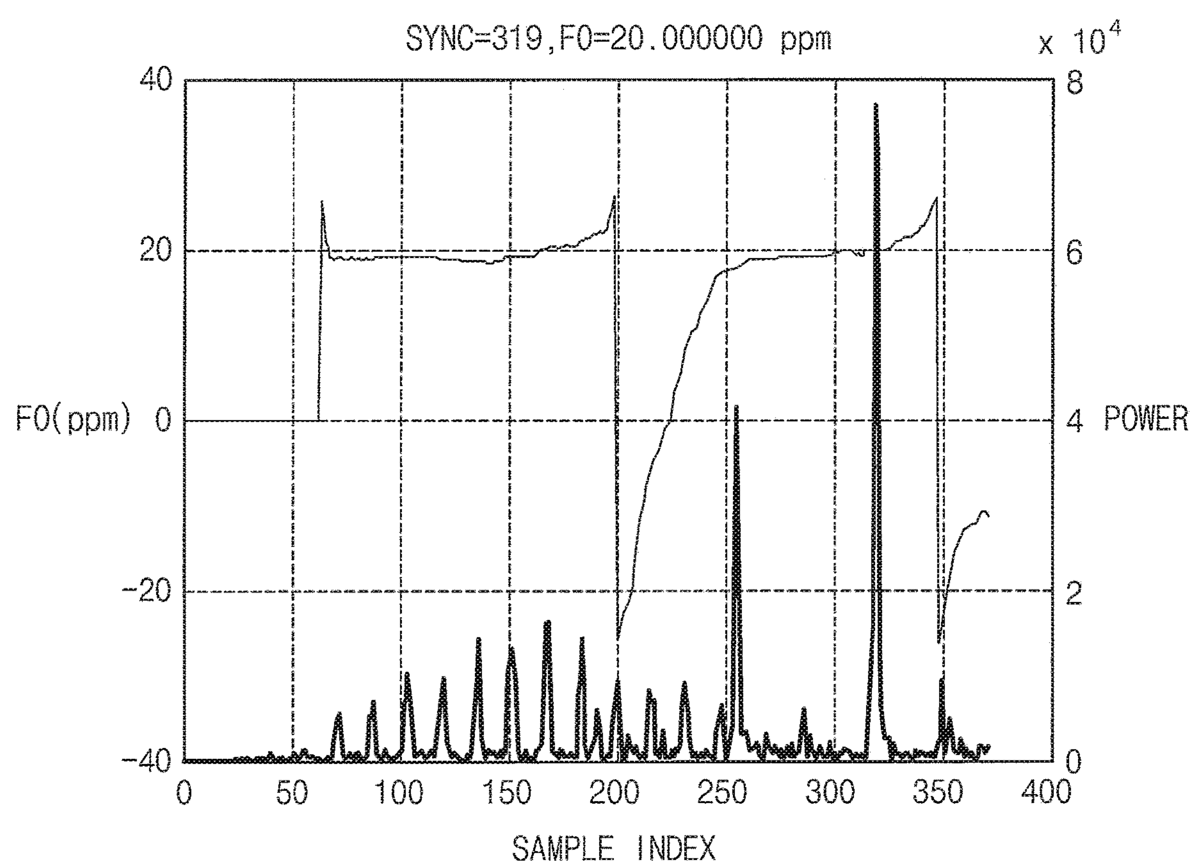

Referring to FIGS. 21A and 21B, detailed operations are illustrated when example embodiments are implemented. The frequency offset FO may be tracked or traced depending on the sample index of the received signal, as illustrated by a thin solid line. The result (e.g., power) of the matched filtering to which the phase information of the corresponding frequency offset is reflected may also be estimated, as illustrated by a thick solid line. FIG. 21A illustrates the measurement process and results for the frequency offset of about 0 ppm (e.g., the AWGN channel) in the band of about 5 GHz, and FIG. 21B illustrates the measurement process and results for the frequency offset of about 20 ppm (e.g., the fading channel) in the band of about 5 GHz. It can be seen that the frequency offset is detected from the maximum value of the matched filtering.

Figure 22A:
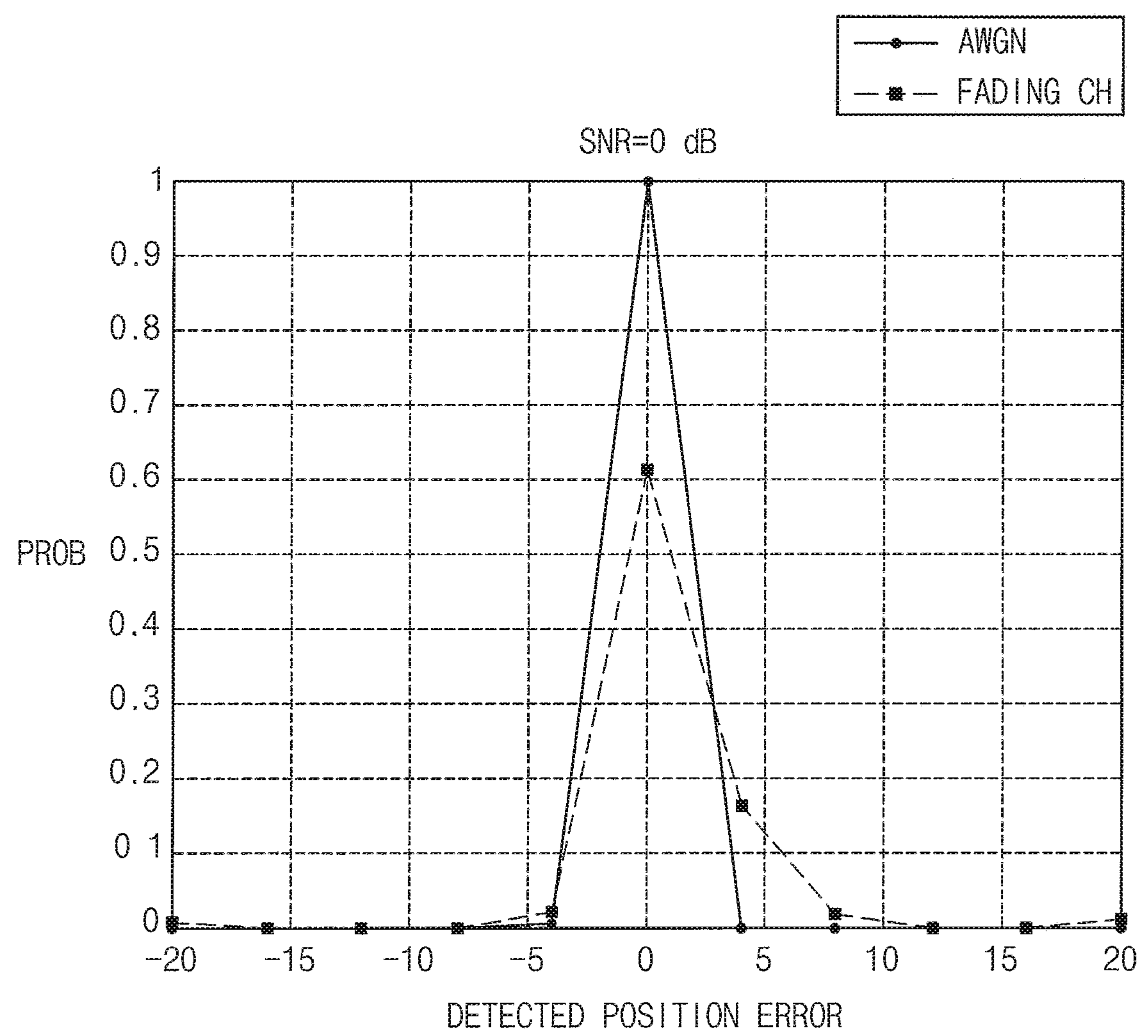
Figure 22B:
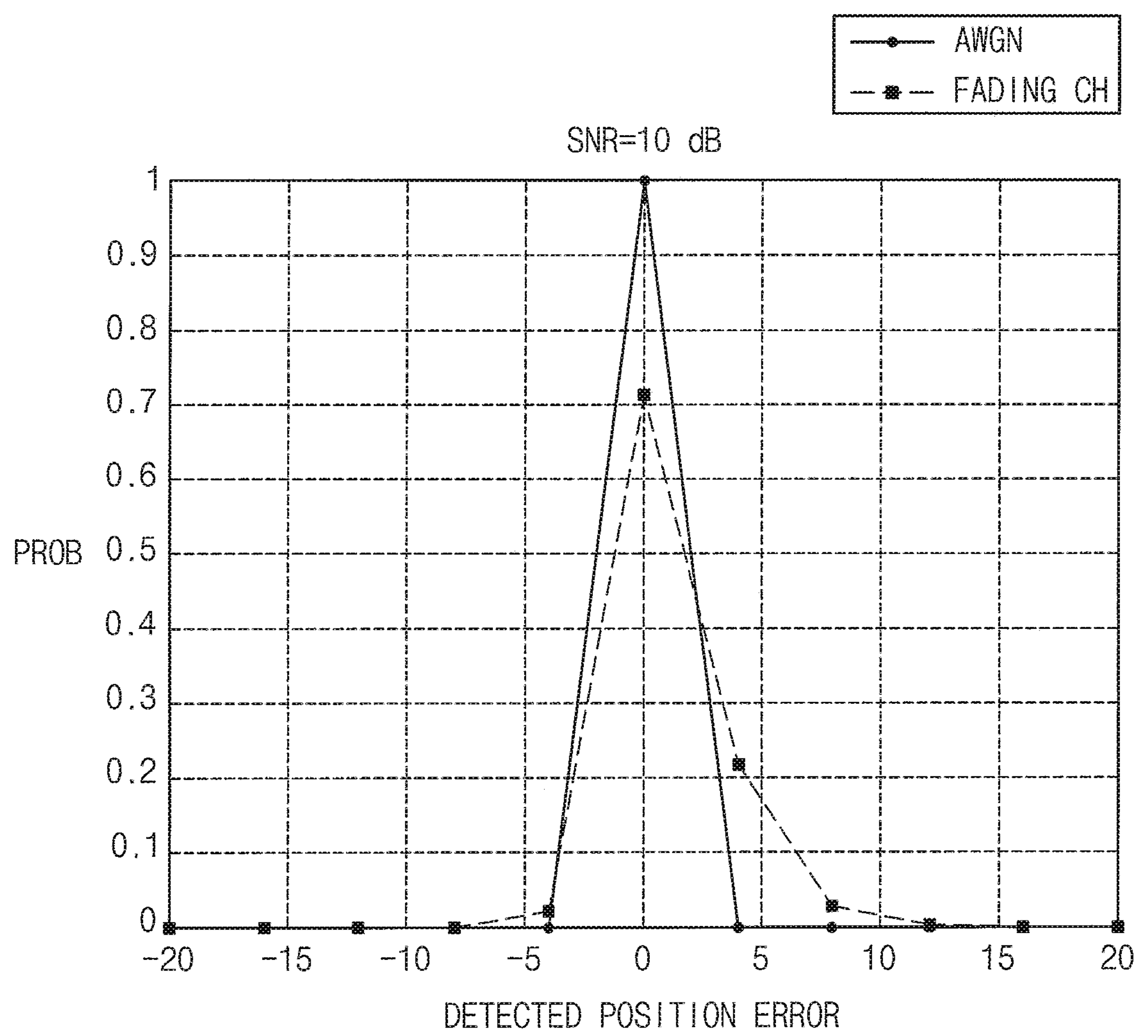

Referring to FIGS. 22A and 22B, the accuracy of the synchronization timing is illustrated depending on the maximum measurement from the matched filtering. The AWGN channel and the fading channel are illustrated, and it can be seen that the performance difference depending on the SNR is not large.

FIG. 23 is a block diagram illustrating an electronic device in a network environment according to example embodiments.

Referring to FIG. 23, an electronic device 301 in a network environment 300 may communicate with an electronic device 302 via a first network 398 (e.g., a short-range wireless communication network), or an electronic device 304 or a server 308 via a second network 399 (e.g., a long-range wireless communication network). For example, the electronic device 301 may communicate with the electronic device 304 via the server 308. For example, the electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, and/or an antenna module 397. In some example embodiments, at least one (e.g., the display device 360 or the camera module 380) of the components may be omitted from the electronic device 301, or one or more other components may be added in the electronic device 301. In some example embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. For example, as at least part of the data processing or computation, the processor 320 may load a command or data received from another component (e.g., the sensor module 376 or the communication module 390) in a volatile memory 332, process the command or the data stored in the volatile memory 332, and store resulting data in a nonvolatile memory 334. In some example embodiments, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). In some example embodiments, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 and/or the nonvolatile memory 334.

The program 340 may be stored in the memory 330 as software, and may include, for example, an operating system (OS) 342, middleware 344, and/or an application 346.

The input device 350 may receive a command or data to be used by another component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for incoming calls. In some example embodiments, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. In some example embodiments, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. In some example embodiments, the audio module 370 may obtain the sound via the input device 350, or output the sound via the sound output device 355 or a headphone of an external electronic device (e.g., an electronic device 302) directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. In some example embodiments, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 377 may support one or more specified protocols to be used for the electronic device 301 to be coupled with the external electronic device (e.g., the electronic device 302) directly (e.g., wired) or wirelessly. In some example embodiments, the interface 377 may include, for example, a high definition multimedia interface (HDMI), a universal serial bus (USB) interface, a secure digital (SD) card interface, and/or an audio interface.

A connecting terminal 378 may include a connector via which the electronic device 301 may be physically connected with the external electronic device (e.g., the electronic device 302). In some example embodiments, the connecting terminal 378 may include, for example, a HDMI connector, a USB connector, a SD card connector, and/or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. In some example embodiments, the haptic module 379 may include, for example, a motor, a piezoelectric element, and/or an electric stimulator.

The camera module 380 may capture a still image or moving images. In some example embodiments, the camera module 380 may include one or more lenses, image sensors, image signal processors, and/or flashes.

The power management module 388 may manage power supplied to the electronic device 301. In some example embodiments, the power management module 388 may be implemented as at least part of, for example, a power management integrated circuit (PMIC).

The battery 389 may supply power to at least one component of the electronic device 301. In some example embodiments, the battery 389 may include, for example, a primary cell that is not rechargeable, a secondary cell that is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. In some example embodiments, the communication module 390 may include a wireless communication module 392 (e.g., a cellular communication module, a short-range wireless communication module, or a global navigation satellite system (GNSS) communication module) and/or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi-components (e.g., multi-chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

In some example embodiments, the wireless communication module 392 included in the communication module 390 may include the transmitter and the receiver included in the wireless communication system according to example embodiments and may perform the method of performing synchronization and frequency offset estimation according to example embodiments. For example, each of the wireless communication module 392 included in the electronic device 301 and a wireless communication module (not illustrated) included in the electronic device 304 may include the transmitter 100 and the receiver 200 in FIG. 2, and the second network 399 formed between the electronic devices 301 and 304 may correspond to the channel between the transmitter 100 and the receiver 200 in FIG. 2. The receiver 200 included in the electronic device 301 may communicate with the transmitter 100 included in the electronic device 304, and may perform the method of performing synchronization and frequency offset estimation according to example embodiments at the initial operation time. Similarly, the receiver 200 included in the electronic device 304 may communicate with the transmitter 100 included in the electronic device 301, and may perform the method of performing synchronization and frequency offset estimation according to example embodiments at the initial operation time.

The antenna module 397 may transmit or receive a signal or power to or from the outside (e.g., the external electronic device) of the electronic device 301. In some example embodiments, the antenna module 397 may include an antenna with a radiating element composed of a conductive material or a conductive pattern formed in or on a substrate (e.g., PCB). In some example embodiments, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. In some example embodiments, another component (e.g., a radio frequency integrated circuit (RFIC)) other than the radiating element may be additionally formed as part of the antenna module 397.

The inventive concept may be applied to various communication devices and systems that are implemented based on the WLAN and various electronic devices and systems that include the communication devices and systems. For example, the inventive concept may be applied to systems such as a personal computer (PC), a workstation, a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of performing synchronization and frequency offset estimation, the method comprising:

receiving an input signal corresponding to a single training sequence;

generating phase information and a phase index by performing an auto-correlation function (ACF) on the input signal;

generating a templet signal associated with a sample index of the input signal based on at least one pre-stored look-up table, the phase index, a frequency bandwidth of the input signal, and the sample index;

calculating power associated with the sample index by performing a matched filtering on the input signal based on the templet signal; and simultaneously determining a synchronization timing and a frequency offset for the input signal based on a result of the matched filtering.

2. The method of claim 1, wherein generating the templet signal associated with the sample index includes:

obtaining a reference templet signal from a first look-up table based on the frequency bandwidth and the sample index;

obtaining a plurality of reference values from a second look-up table based on the frequency bandwidth and the sample index, the second look-up table being different from the first look-up table;

generating a first direction decision signal based on the sample index;

generating a second direction decision signal based on the sample index, the phase index, and the plurality of reference values; and obtaining the templet signal based on the reference templet signal, the first direction decision signal, and the second direction decision signal.

3. The method of claim 2, wherein the reference templet signal and the templet signal are each mapped on ternary lattice coordinates formed on a complex number plane.

4. The method of claim 3, wherein the templet signal is obtained by shifting the reference templet signal on the ternary lattice coordinates based on the phase index.

5. The method of claim 3, wherein:

the reference templet signal includes a reference real number part and a reference imaginary number part, the templet signal includes an output real number part and an output imaginary number part, and the reference real number part, the reference imaginary number part, the output real number part, and the output imaginary number part each have a value corresponding to one of +1, 0, and −1.

6. The method of claim 5, wherein:

the sample index is in a range greater than or equal to zero and less than N, where N is a natural number greater than or equal to two, and the first direction decision signal is obtained based on Equation 1:

$$D(n) = \begin{cases} +j & \text{when } 0 \le n < N/2 \\ -j & \text{when } N/2 \le n < N \end{cases} \quad \text{[Equation 1]}$$

where D(n) denotes the first direction decision signal and n denotes the sample index.

7. The method of claim 6, wherein:

the second direction decision signal includes a real number part shift index and an imaginary number part shift index, and the real number part shift index and the imaginary number part shift index are obtained based on Equation 2 and Equation 3:

$$\text{SHIFT}_{RE}(k, n) = \begin{cases} 0 & \text{when } k < S_{RE}(n, 0) \\ 1 & \text{when } S_{RE}(n, 0) \le k < S_{RE}(n, 1) \\ 2 & \text{others} \end{cases} \quad \text{[Equation 2]}$$

$$\text{SHIFT}_{IM}(k, n) = \begin{cases} 0 & \text{when } k < S_{IM}(n, 0) \\ 1 & \text{when } S_{IM}(n, 0) \le k < S_{IM}(n, 1) \\ 2 & \text{others} \end{cases} \quad \text{[Equation 3]}$$

where $\text{SHIFT}_{RE}(k,n)$ denotes the real number part shift index, $\text{SHIFT}_{IM}(k,n)$ denotes the imaginary number part shift index, k denotes the phase index, and $S_{RE}(n,0)$, $S_{RE}(n,1)$, $S_{IM}(n,0)$, and $S_{IM}(n,1)$ denote the plurality of reference values.

8. The method of claim 7, wherein the output real number part and the output imaginary number part are obtained based on Equation 4, Equation 5, and Equation 6:

$$T_{P,RE}(k, n) = \begin{cases} \text{RE}\{T_{COMP}(n) \cdot D(n)^{SHIFT_{RE}(k,n)}\} & \text{when } T_{RE}(n) = 0 \\ \text{RE}\{T_{RE}(n) \cdot D(n)^{SHIFT_{RE}(k,n)}\} & \text{other} \end{cases} \quad \text{[Equation 4]}$$

$$T_{P,IM}(k, n) = \begin{cases} \text{IM}\{T_{COMP}(n) \cdot D(n)^{SHIFT_{IM}(k,n)}\} & \text{when } T_{IM}(n) = 0 \\ \text{RE}\{T_{IM}(n) \cdot D(n)^{SHIFT_{IM}(k,n)}\} & \text{other} \end{cases} \quad \text{[Equation 5]}$$

$$T_{COMP}(n) = T_{RE}(n) + T_{IM}(n) \cdot j \quad \text{[Equation 6]}$$

where $T_{P,RE}(k,n)$ denotes the output real number part, $T_{P,IM}(k,n)$ denotes the output imaginary number part, $T_{RE}(n)$ denotes the reference real number part, $T_{IM}(n)$ denotes the reference imaginary number part, RE{•} denotes a function of obtaining a real number part, and IM{•} denotes a function of obtaining an imaginary number part.

9. The method of claim 1, wherein:

the input signal includes first through $N_M$-th sample indices, where $N_M$ is a natural number greater than or equal to two, and generating the templet signal associated with the sample index includes:

generating first through $N_M$-th templet signals associated with the first through $N_M$-th sample indices.

10. The method of claim 1, wherein:

the input signal includes first through $N_M$-th sample indices, where $N_M$ is a natural number greater than or equal to two, and calculating the power associated with the sample index includes:

calculating first through $N_M$-th powers associated with the first through $N_M$-th sample indices.

11. The method of claim 10, wherein simultaneously determining the synchronization timing and the frequency offset for the input signal includes:

selecting one of the first through $N_M$-th sample indices based on the first through $N_M$-th powers;

determining a timing corresponding to the selected sample index as the synchronization timing; and determining an offset corresponding to the selected sample index as the frequency offset.

12. The method of claim 11, wherein a power corresponding to the selected sample index is a greatest power among the first through $N_M$-th powers.

13. The method of claim 11, wherein the synchronization timing is determined by performing a cross-correlation function (CCF).

14. The method of claim 11, wherein generating the phase information and the phase index includes:

performing a quantization on the input signal;

performing the auto-correlation function (ACF) on the quantized input signal;

performing an arctangent (ATAN) function on the input signal on which the auto-correlation function (ACF) is performed;

measuring and tracking the phase information based on the input signal on which the arctangent (ATAN) function is performed; and generating the phase index based on the phase information.

15. The method of claim 14, wherein the phase information is measured and tracked by performing an infinite impulse response (IIR) filtering.

16. A receiver comprising:

a first calculator configured to:

receive an input signal corresponding to a single training sequence; and generate phase information and a phase index by performing an auto-correlation function (ACF) on the input signal;

a templet generator configured to generate a templet signal associated with a sample index of the input signal based on at least one pre-stored look-up table, the phase index, a frequency bandwidth of the input signal, and the sample index; and a second calculator configured to:

calculate power associated with the sample index by performing a matched filtering on the input signal based on the templet signal; and simultaneously determine a synchronization timing and a frequency offset for the input signal based on a result of the matched filtering.

17. The receiver of claim 16, wherein the templet generator includes:

a first look-up table configured to store a reference templet signal and output the reference templet signal based on the frequency bandwidth and the sample index;

a second look-up table configured to store a plurality of reference values and output the plurality of reference values based on the frequency bandwidth and the sample index, the second look-up table being different from the first look-up table;

a first decision unit configured to generate a first direction decision signal based on the sample index;

a second decision unit configured to generate a second direction decision signal based on the sample index, the phase index, and the plurality of reference values; and a third decision unit configured to output the templet signal based on the reference templet signal, the first direction decision signal, and the second direction decision signal.

18. The receiver of claim 16, wherein the second calculator includes:

a matched filtering unit configured to calculate first through $N_M$-th powers associated with first through $N_M$-th sample indices that are included in the input signal, where $N_M$ is a natural number greater than or equal to two; and a detecting unit configured to:

select one of the first through $N_M$-th sample indices based on the first through $N_M$-th powers;

determine a timing corresponding to the selected sample index as the synchronization timing; and determine an offset corresponding to the selected sample index as the frequency offset.

19. The receiver of claim 16, wherein the first calculator includes:

a quantization unit configured to perform a quantization on the input signal;

an auto-correlation function (ACF) unit configured to perform the auto-correlation function (ACF) on the quantized input signal;

an arctangent (ATAN) unit configured to perform an arctangent (ATAN) function on the input signal on which the auto-correlation function (ACF) is performed;

a phase update unit configured to measure and track the phase information based on the input signal on which the arctangent (ATAN) function is performed; and a phase indexing unit configured to generate the phase index based on the phase information.

20. A method of performing synchronization and frequency offset estimation, the method comprising:

receiving an input signal corresponding to a single training sequence;

generating phase information and a phase index by performing an auto-correlation function (ACF) on the input signal;

generating a templet signal associated with a sample index of the input signal based on at least one pre-stored look-up table, the phase index, a frequency bandwidth of the input signal, and the sample index;

calculating power associated with the sample index by performing a matched filtering on the input signal based on the templet signal; and simultaneously determining a synchronization timing and a frequency offset for the input signal based on a result of the matched filtering, wherein generating the phase information and the phase index includes:

performing a quantization on the input signal;

performing the auto-correlation function (ACF) on the quantized input signal;

performing an arctangent (ATAN) function on the input signal on which the auto-correlation function (ACF) is performed;

measuring and tracking the phase information based on the input signal on which the arctangent (ATAN) function is performed; and generating the phase index based on the phase information, wherein generating the templet signal associated with the sample index includes:

obtaining a reference templet signal from a first look-up table based on the frequency bandwidth and the sample index;

obtaining a plurality of reference values from a second look-up table based on the frequency bandwidth and the sample index, the second look-up table being different from the first look-up table;

generating a first direction decision signal based on the sample index;

generating a second direction decision signal based on the sample index, the phase index, and the plurality of reference values; and obtaining the templet signal based on the reference templet signal, the first direction decision signal, and the second direction decision signal, wherein calculating the power associated with the sample index includes:

calculating first through $N_M$-th powers associated with first through $N_M$-th sample indices that are included in the input signal, where $N_M$ is a natural number greater than or equal to two, and wherein simultaneously determining the synchronization timing and the frequency offset for the input signal includes:

selecting one of the first through $N_M$-th sample indices based on the first through $N_M$-th powers, the selected sample index corresponding to a greatest power among the first through $N_M$-th powers;

determining a timing corresponding to the selected sample index as the synchronization timing; and determining an offset corresponding to the selected sample index as the frequency offset.

* * * * *